United States Patent
Everhart

(10) Patent No.: US 10,726,417 B1
(45) Date of Patent: Jul. 28, 2020

(54) SYSTEMS AND METHODS FOR MULTIFACTOR AUTHENTICATION

(71) Applicant: JPMorgan Chase Bank, N.A., New York, NY (US)

(72) Inventor: Glenn Cobourn Everhart, Smyrna, DE (US)

(73) Assignee: JPMORGAN CHASE BANK, N.A., New York, NY (US)

(*) Notice: Subject to any disclaimer, the term of this patent is extended or adjusted under 35 U.S.C. 154(b) by 2161 days.

(21) Appl. No.: 13/621,995

(22) Filed: Sep. 18, 2012

Related U.S. Application Data

(63) Continuation of application No. 11/137,409, filed on May 26, 2005, now abandoned, which is a continuation-in-part of application No. 10/419,107, filed on Apr. 21, 2003, now Pat. No. 7,899,753, which is a continuation-in-part of application No. 10/105,471, filed on Mar. 25, 2002, now abandoned.

(51) Int. Cl.
*G06Q 20/40* (2012.01)
*G06F 21/34* (2013.01)

(52) U.S. Cl.
CPC .............. *G06Q 20/40* (2013.01); *G06F 21/34* (2013.01)

(58) Field of Classification Search
CPC ...................................................... G06Q 20/40
See application file for complete search history.

(56) References Cited

U.S. PATENT DOCUMENTS

| | | |
|---|---|---|
| 2,005,003 A | 6/1935 | Patton et al. |
| 2,405,500 A | 8/1946 | Guanella |
| 3,634,669 A | 1/1972 | Soumas et al. |
| 3,665,162 A | 5/1972 | Yamamoto et al. |
| 3,705,385 A | 12/1972 | Batz |
| 3,860,870 A | 1/1975 | Furuya |

(Continued)

FOREIGN PATENT DOCUMENTS

| | | |
|---|---|---|
| CA | 2293321 | 6/1998 |
| CA | 2430549 | 6/2002 |

(Continued)

OTHER PUBLICATIONS

Hasting, Nelson et. al., A Case Study of Authenticated and Secure File Transfer The Iowa Campaign Finance Reporting System (1997).

(Continued)

*Primary Examiner* — Zeshan Qayyum
*Assistant Examiner* — Yingying Zhou
(74) *Attorney, Agent, or Firm* — Greenberg Traurig LLP

(57) ABSTRACT

The invention provides an authentication system and method. In particular, the invention provides a method for performing a financial authentication utilizing a token associated with a user, the method comprising the token generating a set of display characters that are viewable by the user, the token generating the display characters using logic; the user transforming a portion of the set of display characters using a transformation process, based on knowledge of the user, so as to form a display character sequence; the user outputting the display character sequence to an authentication entity; and the authentication entity authenticating the display character sequence using the logic and knowledge of the transformation.

9 Claims, 11 Drawing Sheets

(56) References Cited

U.S. PATENT DOCUMENTS

| | | |
|---|---|---|
| 3,938,090 A | 2/1976 | Borison et al. |
| 3,946,206 A | 3/1976 | Darjany |
| 4,013,962 A | 3/1977 | Beseke et al. |
| 4,047,033 A | 9/1977 | Malmberg et al. |
| 4,123,747 A | 10/1978 | Lancto et al. |
| 4,160,120 A | 7/1979 | Barnes et al. |
| 4,200,770 A | 4/1980 | Hellman et al. |
| 4,249,180 A | 2/1981 | Eberle et al. |
| 4,255,811 A | 3/1981 | Alder |
| 4,302,810 A | 11/1981 | Bouricius et al. |
| 4,316,055 A | 2/1982 | Feistel |
| 4,405,829 A | 9/1983 | Rivest et al. |
| 4,453,074 A | 6/1984 | Weinstein |
| 4,454,414 A | 6/1984 | Benton |
| 4,465,206 A | 8/1984 | Sorel et al. |
| 4,471,164 A | 9/1984 | Henry |
| 4,523,087 A | 6/1985 | Benton |
| 4,529,870 A | 7/1985 | Chaum |
| 4,545,838 A | 10/1985 | Minkus et al. |
| 4,575,621 A | 3/1986 | Dreifus |
| 4,582,985 A | 4/1986 | Lofberg |
| 4,605,844 A | 8/1986 | Haggan |
| 4,614,861 A | 9/1986 | Pavlov et al. |
| 4,634,845 A | 1/1987 | Riley |
| 4,650,981 A | 3/1987 | Foletta |
| 4,663,500 A | 5/1987 | Okamoto et al. |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,723,246 A | 2/1988 | Weldon, Jr. |
| 4,746,787 A | 4/1988 | Okada |
| 4,747,050 A | 5/1988 | Brachtl et al. |
| 4,747,139 A | 5/1988 | Taaffe |
| 4,750,119 A | 6/1988 | Robertson |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,845,347 A | 7/1989 | McCrindle |
| 4,868,376 A | 9/1989 | Lessin et al. |
| 4,868,877 A | 9/1989 | Fischer |
| 4,870,259 A | 9/1989 | Boggan et al. |
| 4,882,675 A | 11/1989 | Nichtberger et al. |
| 4,890,324 A | 12/1989 | Jansen |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,965,568 A | 10/1990 | Atalla et al. |
| 4,968,873 A | 11/1990 | Dethloff et al. |
| 4,975,840 A | 12/1990 | DeTore et al. |
| 4,977,501 A | 12/1990 | Lefevre |
| 4,978,401 A | 12/1990 | Bonomi |
| 4,980,913 A | 12/1990 | Skret |
| 4,984,272 A | 1/1991 | McIlroy et al. |
| 4,992,940 A | 2/1991 | Dworkin |
| 5,001,755 A | 3/1991 | Skret |
| 5,005,200 A | 4/1991 | Fischer |
| 5,016,274 A | 5/1991 | Micali et al. |
| 5,018,196 A | 5/1991 | Takaragi et al. |
| 5,025,372 A | 6/1991 | Burton et al. |
| 5,049,728 A | 9/1991 | Rovin |
| 5,054,067 A | 10/1991 | Moroney et al. |
| 5,055,662 A | 10/1991 | Hasewaga |
| 5,072,380 A | 12/1991 | Randelman et al. |
| 5,080,748 A | 1/1992 | Bonomi |
| 5,095,194 A | 3/1992 | Barbanell |
| 5,117,355 A | 5/1992 | McCarthy |
| 5,161,244 A | 11/1992 | Maurer |
| 5,163,098 A | 11/1992 | Dahbura |
| 5,175,416 A | 12/1992 | Mansvelt |
| 5,180,901 A | 1/1993 | Hiramatsu |
| 5,192,947 A | 3/1993 | Neustein |
| 5,196,840 A | 3/1993 | Leith et al. |
| 5,202,286 A | 4/1993 | Nakatani |
| 5,202,826 A | 4/1993 | McCarthy |
| 5,206,803 A | 4/1993 | Vitagliano |
| 5,212,792 A | 5/1993 | Gerety et al. |
| 5,218,631 A | 6/1993 | Katz |
| 5,225,664 A | 7/1993 | Iijima |
| 5,231,668 A | 7/1993 | Kravitz |
| 5,247,190 A | 9/1993 | Friend et al. |
| 5,253,294 A | 10/1993 | Maurer |
| 5,257,486 A | 11/1993 | Holmwall |
| 5,267,314 A | 11/1993 | Stambler |
| 5,276,311 A | 1/1994 | Hartmut |
| 5,367,572 A | 1/1994 | Weiss |
| 5,287,268 A | 2/1994 | McCarthy |
| 5,287,269 A | 2/1994 | Dorrough et al. |
| 5,297,026 A | 3/1994 | Hoffman |
| 5,302,810 A | 4/1994 | Gauthier et al. |
| 5,305,456 A | 4/1994 | Boitana |
| 5,311,594 A | 5/1994 | Penzias |
| 5,315,504 A | 5/1994 | Lembie |
| 5,319,710 A | 6/1994 | Atalla et al. |
| 5,326,959 A | 7/1994 | Perazza |
| 5,326,960 A | 7/1994 | Tannenbaum |
| 5,328,809 A | 7/1994 | Holmes et al. |
| 5,341,428 A | 8/1994 | Schatz |
| 5,339,239 A | 9/1994 | Manabe et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,365,575 A | 11/1994 | Katz |
| 5,382,784 A | 1/1995 | Eberhardt |
| 5,383,113 A | 1/1995 | Knight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,432,326 A | 7/1995 | Noblett et al. |
| 5,450,477 A | 9/1995 | Amarant et al. |
| 5,450,491 A | 9/1995 | McNair |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt et al. |
| 5,466,919 A | 11/1995 | Henry |
| 5,466,920 A | 11/1995 | Nair et al. |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,479,530 A | 12/1995 | Nair et al. |
| 5,482,139 A | 1/1996 | Rivalto |
| 5,483,444 A | 1/1996 | Malark |
| 5,483,445 A | 1/1996 | Pickering |
| 5,495,981 A | 3/1996 | Warther |
| 5,500,514 A | 3/1996 | Veeneman et al. |
| 5,500,890 A | 3/1996 | Rogge et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,524,073 A | 6/1996 | Stambler |
| 5,530,232 A | 6/1996 | Taylor |
| 5,530,235 A | 6/1996 | Stefik et al. |
| 5,532,689 A | 7/1996 | Bueno |
| 5,537,314 A | 7/1996 | Kanter |
| 5,541,583 A | 7/1996 | Mandelbaum |
| 5,544,086 A | 8/1996 | Davis et al. |

(56) References Cited

U.S. PATENT DOCUMENTS

| | | |
|---|---|---|
| 5,544,246 A | 8/1996 | Mandelbaum et al. |
| 5,553,120 A | 9/1996 | Katz |
| 5,555,303 A | 9/1996 | Stambler |
| 5,577,109 A | 11/1996 | Stimson et al. |
| 5,578,808 A | 11/1996 | Taylor |
| 5,581,064 A | 12/1996 | Riley et al. |
| 5,583,933 A | 12/1996 | Mark |
| 5,585,787 A | 12/1996 | Wallerstein |
| 5,590,038 A | 12/1996 | Pitroda |
| 5,592,553 A | 1/1997 | Guski et al. |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,615,277 A | 3/1997 | Hoffman |
| 5,617,474 A | 4/1997 | Ditzig et al. |
| 5,621,787 A | 4/1997 | McKoy et al. |
| 5,621,812 A | 4/1997 | Deaton et al. |
| 5,649,114 A | 4/1997 | Deaton et al. |
| 5,642,485 A | 5/1997 | Deaton et al. |
| 5,637,845 A | 6/1997 | Kolls |
| 5,638,457 A | 6/1997 | Deaton et al. |
| 5,642,279 A | 6/1997 | Stone |
| 5,644,723 A | 7/1997 | Deaton et al. |
| 5,644,727 A | 7/1997 | Atkins |
| 5,644,778 A | 7/1997 | Burks et al. |
| 5,646,998 A | 7/1997 | Stambler |
| 5,649,117 A | 7/1997 | Landry |
| 5,649,118 A | 7/1997 | Carlisle et al. |
| 5,653,914 A | 8/1997 | Holmes et al. |
| 5,657,390 A | 8/1997 | Elgamal et al. |
| 5,661,807 A | 8/1997 | Guski et al. |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,521 A | 10/1997 | Garrou |
| 5,677,955 A | 10/1997 | Doggett et al. |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,706,452 A | 1/1998 | Ivanov |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,721,768 A | 2/1998 | Stimson et al. |
| 5,721,781 A | 2/1998 | Deo et al. |
| 5,724,423 A | 3/1998 | Khello |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson et al. |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,742,845 A | 4/1998 | Wagner |
| 5,745,049 A | 4/1998 | Akiyama et al. |
| 5,745,555 A | 4/1998 | Mark |
| 5,745,706 A | 4/1998 | Wolfberg et al. |
| 5,749,075 A | 5/1998 | Toader et al. |
| 5,760,381 A | 6/1998 | Stich et al. |
| 5,764,770 A | 6/1998 | Schipper et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,781,909 A | 7/1998 | Logan et al. |
| 5,787,156 A | 7/1998 | Katz |
| 5,787,404 A | 7/1998 | Fernandez-Holman |
| 5,789,733 A | 8/1998 | Jachimowicz et al. |
| 5,793,302 A | 8/1998 | Mark |
| 5,794,207 A | 8/1998 | Walker |
| 5,796,827 A | 8/1998 | Coppersmith et al. |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,815,657 A | 9/1998 | Williams et al. |
| 5,815,658 A | 9/1998 | Kuriyama |
| 5,815,665 A | 9/1998 | Teper et al. |
| 5,819,234 A | 10/1998 | Slavin et al. |
| 5,819,237 A | 10/1998 | Garman |
| 5,825,871 A | 10/1998 | Mark |
| 5,825,890 A | 10/1998 | Elgamal et al. |
| 5,826,023 A | 10/1998 | Hall et al. |
| 5,832,090 A | 11/1998 | Raspotnik |
| 5,832,211 A | 11/1998 | Blakley, III et al. |
| 5,832,457 A | 11/1998 | O'Brien |
| 5,835,061 A | 11/1998 | Stewart |
| 5,835,576 A | 11/1998 | Katz |
| 5,838,812 A | 11/1998 | Pare et al. |
| 5,838,903 A | 11/1998 | Blakely, III et al. |
| 5,839,113 A | 11/1998 | Federau et al. |
| 5,845,259 A | 12/1998 | West et al. |
| 5,845,260 A | 12/1998 | Nakano et al. |
| 5,848,190 A | 12/1998 | Kleehammer et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,862,323 A | 1/1999 | Blakely, III et al. |
| 5,864,609 A | 1/1999 | Cross et al. |
| 5,864,828 A | 1/1999 | Atkins |
| 5,864,830 A | 1/1999 | Armetta et al. |
| 5,864,871 A | 1/1999 | Kitain et al. |
| 5,866,889 A | 2/1999 | Weiss et al. |
| 5,870,718 A | 2/1999 | Spector |
| 5,870,721 A | 2/1999 | Norris |
| 5,870,723 A | 2/1999 | Pare et al. |
| 5,875,437 A | 2/1999 | Atkins |
| 5,878,141 A | 3/1999 | Daly et al. |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,884,312 A | 3/1999 | Dustan et al. |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,898,838 A | 4/1999 | Wagner |
| 5,903,878 A | 5/1999 | Talati et al. |
| 5,905,246 A | 5/1999 | Fajkowski |
| 5,905,908 A | 5/1999 | Wagner |
| 5,907,142 A | 5/1999 | Kelsey |
| 5,911,135 A | 6/1999 | Atkins |

(56) References Cited

U.S. PATENT DOCUMENTS

| | | |
|---|---|---|
| 5,911,136 A | 6/1999 | Atkins |
| 5,915,244 A | 6/1999 | Jack et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,930,217 A | 7/1999 | Kayanuma |
| 5,931,764 A | 8/1999 | Freeman et al. |
| 5,933,817 A | 8/1999 | Hucal |
| 5,936,541 A | 8/1999 | Stambler |
| 5,937,068 A | 8/1999 | Audebert |
| 5,940,811 A | 8/1999 | Norris |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,963,648 A | 10/1999 | Rosen |
| 5,970,478 A | 10/1999 | Walker et al. |
| 5,970,479 A | 10/1999 | Shepherd |
| 5,970,480 A | 10/1999 | Kalina |
| 5,974,148 A | 10/1999 | Stambler |
| 5,974,399 A | 10/1999 | Giuliani et al. |
| RE36,365 E | 11/1999 | Levine et al. |
| 5,984,180 A | 11/1999 | Albrecht |
| 5,984,191 A | 11/1999 | Chapin, Jr. |
| 5,987,434 A | 11/1999 | Libman |
| 5,987,454 A | 11/1999 | Hobbs |
| 5,988,509 A | 11/1999 | Taskett |
| 5,991,413 A | 11/1999 | Arditti et al. |
| 5,991,748 A | 11/1999 | Taskett |
| 5,991,750 A | 11/1999 | Craig |
| 6,003,762 A | 11/1999 | Hayashida |
| 5,999,971 A | 12/1999 | Buckland |
| 6,000,608 A | 12/1999 | Dorf |
| 6,000,832 A | 12/1999 | Franklin et al. |
| 6,002,383 A | 12/1999 | Shimada |
| 6,004,681 A | 12/1999 | Epstein et al. |
| 6,006,988 A | 12/1999 | Behrmann et al. |
| 6,009,415 A | 12/1999 | Shurling et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,476 A | 1/2000 | Maes et al. |
| 6,016,482 A | 1/2000 | Molinari et al. |
| 6,016,954 A | 1/2000 | Abe et al. |
| 6,019,284 A | 2/2000 | Freeman et al. |
| 6,026,370 A | 2/2000 | Jermyn |
| 6,026,398 A | 2/2000 | Brown et al. |
| 6,029,139 A | 2/2000 | Cunningham et al. |
| 6,029,890 A | 2/2000 | Austin |
| 6,032,136 A | 2/2000 | Brake, Jr. et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,044,402 A | 3/2000 | Jacobson et al. |
| 6,045,042 A | 4/2000 | Ohno |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,058,378 A | 5/2000 | Clark et al. |
| 6,061,660 A | 5/2000 | Eggleston et al. |
| 6,064,985 A | 5/2000 | Anderson |
| 6,065,120 A | 5/2000 | Laursen et al. |
| 6,065,675 A | 5/2000 | Teicher |
| 6,067,531 A | 5/2000 | Hoyt et al. |
| 6,068,183 A | 5/2000 | Freeman et al. |
| 6,069,968 A | 5/2000 | Shaw et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,081,900 A | 6/2000 | Subramaniam et al. |
| 6,091,817 A | 7/2000 | Bertina et al. |
| 6,092,056 A | 7/2000 | Tull, Jr. et al. |
| 6,092,057 A | 7/2000 | Zimmermann et al. |
| 6,092,192 A | 7/2000 | Kanevsky et al. |
| 6,095,412 A | 8/2000 | Bertina et al. |
| 6,095,416 A | 8/2000 | Grant et al. |
| 6,098,053 A | 8/2000 | Slater |
| 6,105,006 A | 8/2000 | Davis et al. |
| 6,105,011 A | 8/2000 | Morrison, Jr. |
| 6,105,865 A | 8/2000 | Hardesty |
| 6,115,458 A | 9/2000 | Taskett |
| 6,115,642 A | 9/2000 | Brown et al. |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,134,536 A | 10/2000 | Shepherd |
| 6,134,592 A | 10/2000 | Montulli |
| 6,138,911 A | 10/2000 | Fredregill et al. |
| 6,138,917 A | 10/2000 | Chapin, Jr. |
| 6,141,666 A | 10/2000 | Tobin |
| 6,144,848 A | 11/2000 | Walsh et al. |
| 6,145,741 A | 11/2000 | Wisdom et al. |
| 6,148,297 A | 11/2000 | Swor et al. |
| 6,161,096 A | 12/2000 | Bell |
| 6,161,113 A | 12/2000 | Mora et al. |
| 6,163,770 A | 12/2000 | Gamble et al. |
| 6,163,771 A * | 12/2000 | Walker ............... G06Q 20/04 705/18 |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,059 B1 | 1/2001 | Angotti et al. |
| 6,182,220 B1 | 1/2001 | Chen et al. |
| 6,182,894 B1 | 2/2001 | Hackett et al. |
| 6,186,793 B1 | 2/2001 | Brubaker |
| 6,188,309 B1 | 2/2001 | Levine |
| 6,189,787 B1 | 2/2001 | Dorf |
| 6,195,644 B1 | 2/2001 | Bowie |
| 6,202,053 B1 | 3/2001 | Christiansen et al. |
| 6,202,066 B1 | 3/2001 | Barkley |
| 6,202,158 B1 | 3/2001 | Urano et al. |
| RE37,122 E | 4/2001 | Levine et al. |
| 6,213,391 B1 | 4/2001 | Lewis |
| 6,219,639 B1 | 4/2001 | Bakis et al. |
| 6,223,168 B1 | 4/2001 | McGurl et al. |
| 6,226,752 B1 | 5/2001 | Gupta et al. |
| 6,227,447 B1 | 5/2001 | Campisano |
| 6,243,688 B1 | 6/2001 | Kalina |
| 6,256,664 B1 | 7/2001 | Donoho et al. |
| 6,263,316 B1 | 7/2001 | Khan et al. |
| 6,265,977 B1 | 7/2001 | Vega et al. |
| 6,278,981 B1 | 8/2001 | Dembo et al. |
| 6,278,996 B1 | 8/2001 | Richardson et al. |
| 6,292,786 B1 | 9/2001 | Deaton et al. |
| 6,295,522 B1 | 9/2001 | Boesch |
| 6,298,336 B1 | 10/2001 | Davis et al. |
| 6,308,268 B1 | 10/2001 | Audebert |
| 6,315,195 B1 | 11/2001 | Ramachandran |
| 6,317,834 B1 | 11/2001 | Gennaro et al. |
| 6,327,575 B1 | 12/2001 | Katz |
| 6,327,578 B1 | 12/2001 | Linehan |
| 6,330,543 B1 | 12/2001 | Kepecs |
| 6,336,099 B1 | 1/2002 | Barnett et al. |
| 6,339,423 B1 | 1/2002 | Sampson et al. |
| 6,341,724 B2 | 1/2002 | Campisano |
| 6,343,323 B1 | 1/2002 | Kalpio et al. |
| 6,343,743 B1 | 2/2002 | Lamla |
| 6,345,261 B1 | 2/2002 | Feidelson |
| 6,345,766 B1 | 2/2002 | Taskett et al. |
| 6,349,290 B1 | 2/2002 | Horowitz et al. |
| 6,349,291 B1 | 2/2002 | Varma |

(56) References Cited

U.S. PATENT DOCUMENTS

| | | |
|---|---|---|
| 6,360,954 B1 | 3/2002 | Barnardo |
| 6,363,381 B1 | 3/2002 | Lee et al. |
| 6,366,220 B1 | 4/2002 | Elliott |
| 6,366,682 B1 | 4/2002 | Hoffman et al. |
| 6,373,969 B1 | 4/2002 | Adler |
| 6,381,587 B1 | 4/2002 | Guzelsu |
| 6,385,591 B1 | 5/2002 | Mankoff |
| 6,385,652 B1 | 5/2002 | Brown et al. |
| 6,386,444 B1 | 5/2002 | Sullivan |
| 6,397,202 B1 | 5/2002 | Higgins et al. |
| 6,401,125 B1 | 6/2002 | Makarios et al. |
| 6,402,039 B1 | 6/2002 | Freeman et al. |
| 6,405,182 B1 | 6/2002 | Cuervo |
| 6,411,933 B1 | 6/2002 | Maes et al. |
| 6,411,947 B1 | 6/2002 | Rice et al. |
| 6,422,459 B1 | 7/2002 | Kawan |
| 6,422,462 B1 | 7/2002 | Cohen |
| 6,424,949 B1 | 7/2002 | Deaton et al. |
| 6,429,927 B1 | 8/2002 | Borza |
| 6,434,259 B1 | 8/2002 | Hamid et al. |
| 6,438,666 B2 | 8/2002 | Cassagnol et al. |
| 6,446,053 B1 | 9/2002 | Elliott |
| 6,446,210 B1 | 9/2002 | Borza |
| 6,449,765 B1 | 9/2002 | Ballard |
| 6,450,407 B1 | 9/2002 | Freeman et al. |
| 6,463,039 B1 | 10/2002 | Ricci et al. |
| 6,467,684 B2 | 10/2002 | Fite et al. |
| 6,470,357 B1 | 10/2002 | Garcia, Jr. et al. |
| 6,473,500 B1 | 10/2002 | Risafi et al. |
| 6,484,144 B2 | 11/2002 | Marlin et al. |
| 6,484,148 B1 | 11/2002 | Boyd |
| 6,484,149 B1 | 11/2002 | Jammes |
| 6,487,641 B1 | 11/2002 | Cusson et al. |
| 6,490,601 B1 | 12/2002 | Markus et al. |
| 6,498,657 B1 | 12/2002 | Kuntz et al. |
| 6,498,861 B1 | 12/2002 | Hamid et al. |
| 6,505,168 B1 | 1/2003 | Rothman et al. |
| 6,507,912 B1 | 1/2003 | Matyas, Jr. et al. |
| 6,519,763 B1 | 2/2003 | Kaufer et al. |
| 6,526,404 B1 | 2/2003 | Slater et al. |
| 6,539,363 B1 | 3/2003 | Allgeier et al. |
| 6,539,424 B1 | 3/2003 | Dutta |
| 6,560,578 B2 | 5/2003 | Eldering |
| 6,560,581 B1 | 5/2003 | Fox et al. |
| 6,574,348 B1 | 6/2003 | Venkatesan et al. |
| 6,574,603 B1 | 6/2003 | Dickson et al. |
| 6,580,814 B1 | 6/2003 | Ittycheriah et al. |
| 6,581,839 B1 | 6/2003 | Lasch et al. |
| 6,584,505 B1 | 6/2003 | Howard et al. |
| 6,587,835 B1 | 7/2003 | Treyz et al. |
| 6,589,291 B1 | 7/2003 | Boag et al. |
| 6,592,044 B1 | 7/2003 | Wong et al. |
| 6,594,640 B1 | 7/2003 | Postrel |
| 6,601,761 B1 | 8/2003 | Katis |
| 6,607,127 B2 | 8/2003 | Wong |
| 6,609,106 B1 | 8/2003 | Robertson |
| 6,609,111 B1 | 8/2003 | Bell |
| 6,609,654 B1 | 8/2003 | Anderson et al. |
| RE38,255 E | 9/2003 | Levine et al. |
| 6,615,189 B1 | 9/2003 | Phillips et al. |
| 6,615,190 B1 | 9/2003 | Slater |
| 6,624,761 B2 | 9/2003 | Fallon |
| 6,625,582 B2 | 9/2003 | Richman et al. |
| 6,631,849 B2 | 10/2003 | Blossom |
| 6,640,302 B1 | 10/2003 | Subramaniam et al. |
| 6,641,049 B2 | 11/2003 | Luu |
| 6,641,050 B2 | 11/2003 | Kelley et al. |
| 6,651,168 B1 | 11/2003 | Kao et al. |
| 6,668,321 B2 | 12/2003 | Nendell et al. |
| 6,668,322 B1 | 12/2003 | Wood et al. |
| 6,671,818 B1 | 12/2003 | Mikurak |
| 6,675,127 B2 | 1/2004 | LaBlanc et al. |
| 6,675,261 B2 | 1/2004 | Shandony |
| 6,684,212 B1 | 1/2004 | Day et al. |
| 6,684,248 B1 | 1/2004 | Janacek et al. |
| 6,684,384 B1 | 1/2004 | Bickerton et al. |
| 6,687,245 B2 | 2/2004 | Fangman et al. |
| 6,693,544 B1 | 2/2004 | Hebbecker |
| 6,697,947 B1 | 2/2004 | Matyas, Jr. et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,727,802 B2 | 4/2004 | Kelly et al. |
| 6,735,695 B1 | 5/2004 | Gopalakrishnan et al. |
| 6,738,779 B1 | 5/2004 | Shapira |
| D490,840 S | 6/2004 | Arakaki et al. |
| D491,186 S | 6/2004 | Arakaki et al. |
| D491,953 S | 6/2004 | Arakaki et al. |
| 6,745,938 B2 | 6/2004 | Sullivan |
| 6,751,654 B2 | 6/2004 | Massarani et al. |
| 6,754,833 B1 | 6/2004 | Black et al. |
| 6,755,341 B1 | 6/2004 | Wong et al. |
| 6,763,388 B1 | 7/2004 | Tsimelzon |
| 6,766,370 B2 | 7/2004 | Glommen et al. |
| 6,769,605 B1 | 8/2004 | Magness |
| 6,785,810 B1 | 8/2004 | Lirov et al. |
| D496,365 S | 9/2004 | Liu et al. |
| 6,789,115 B1 | 9/2004 | Singer et al. |
| 6,792,572 B1 | 9/2004 | Frohlick |
| 6,802,008 B1 | 10/2004 | Ikefuji et al. |
| 6,805,287 B2 | 10/2004 | Bishop |
| 6,805,288 B2 | 10/2004 | Routhenstein et al. |
| 6,810,395 B1 | 10/2004 | Bharat |
| D498,236 S | 11/2004 | Liu et al. |
| 6,819,219 B1 | 11/2004 | Bolle et al. |
| 6,820,061 B2 | 11/2004 | Postrel |
| 6,826,696 B1 | 11/2004 | Chawla et al. |
| 6,829,586 B2 | 12/2004 | Postrel |
| 6,832,587 B2 | 12/2004 | Wampula et al. |
| 6,842,739 B2 | 1/2005 | Postrel |
| 6,847,991 B1 | 1/2005 | Kurapati |
| 6,856,970 B1 | 2/2005 | Campbell et al. |
| 6,865,547 B1 | 3/2005 | Brake, Jr. et al. |
| 6,868,391 B1 | 3/2005 | Hultgren |
| 6,868,426 B1 | 3/2005 | Mankoff |
| 6,892,231 B2 | 5/2005 | Jager |
| 6,907,566 B1 | 6/2005 | McElfresh et al. |
| 6,925,481 B2 | 8/2005 | Singhal et al. |
| 6,931,382 B2 | 8/2005 | Laage et al. |
| 6,934,848 B1 | 8/2005 | King et al. |
| 6,937,976 B2 | 8/2005 | Apte |
| 6,938,020 B2 | 8/2005 | Nakayama et al. |
| 6,938,158 B2 | 8/2005 | Azuma |
| 6,947,898 B2 | 9/2005 | Postrel |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,970,830 B1 | 11/2005 | Samra et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 6,999,938 B1 | 2/2006 | Libman |
| 7,006,983 B1 | 2/2006 | Packes et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,047,222 B1 | 5/2006 | Bush |
| 7,051,199 B1 | 5/2006 | Berson et al. |
| 7,051,330 B1 | 5/2006 | Kaler et al. |
| 7,051,929 B2 | 5/2006 | Li |
| 7,058,817 B1 | 6/2006 | Ellmore |
| 7,069,434 B1 | 6/2006 | Ilnicki et al. |
| 7,076,453 B2 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,117,239 B1 | 10/2006 | Hansen |

(56) References Cited

U.S. PATENT DOCUMENTS

| | | |
|---|---|---|
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,143,174 B2 | 11/2006 | Miller et al. |
| 7,155,614 B2 | 12/2006 | Ellmore |
| 7,161,506 B2 | 1/2007 | Fallon |
| 7,163,153 B2 | 1/2007 | Blossom |
| 7,185,094 B2 | 2/2007 | Marquette et al. |
| 7,188,181 B1 | 3/2007 | Squier et al. |
| 7,191,952 B2 | 3/2007 | Blossom |
| 7,195,154 B2 | 3/2007 | Routhenstein |
| 7,197,470 B1 | 3/2007 | Arnett |
| 7,203,909 B1 | 4/2007 | Horvitz et al. |
| 7,225,249 B1 | 5/2007 | Barry |
| 7,228,155 B2 | 6/2007 | Saunders |
| 7,249,112 B2 | 7/2007 | Berardi et al. |
| 7,272,857 B1 | 9/2007 | Everhart |
| 7,299,201 B2 | 11/2007 | Jammes |
| 7,312,707 B1 | 12/2007 | Bishop et al. |
| 7,321,864 B1 | 1/2008 | Gendler |
| 7,353,383 B2 | 4/2008 | Skingle |
| 7,357,331 B2 | 4/2008 | Blossom |
| 7,370,011 B2 | 5/2008 | Bennett |
| 7,395,241 B1 | 7/2008 | Cook et al. |
| 7,400,274 B2 | 7/2008 | Fallon et al. |
| 7,417,568 B2 | 8/2008 | Fallon et al. |
| 7,444,672 B2 | 10/2008 | Ellmore |
| 7,461,265 B2 | 12/2008 | Ellmore |
| 7,472,171 B2 | 12/2008 | Miller et al. |
| 7,480,631 B1 | 1/2009 | Merced et al. |
| 7,490,064 B2 | 2/2009 | Allin et al. |
| 7,493,288 B2 | 2/2009 | Biship et al. |
| 7,506,806 B2 | 3/2009 | Bonalle et al. |
| 7,599,856 B2 | 10/2009 | Agrawal et al. |
| 7,624,277 B1 * | 11/2009 | Simard .................. G06F 21/31 704/270 |
| 2001/0002487 A1 | 5/2001 | Grawrock et al. |
| 2001/0011243 A1 | 8/2001 | Dembo et al. |
| 2001/0011250 A1 | 8/2001 | Paltenghe et al. |
| 2001/0016835 A1 | 8/2001 | Hansmann et al. |
| 2001/0027441 A1 | 10/2001 | Wankmueller |
| 2001/0027474 A1 | 10/2001 | Nachman et al. |
| 2001/0029464 A1 | 10/2001 | Schweitzwer |
| 2001/0032183 A1 | 10/2001 | Landry |
| 2001/0032312 A1 | 10/2001 | Runje et al. |
| 2001/0034663 A1 | 10/2001 | Teveler et al. |
| 2001/0034682 A1 | 10/2001 | Knight et al. |
| 2001/0038033 A1 | 11/2001 | Habib |
| 2001/0044293 A1 | 11/2001 | Morgan |
| 2001/0047342 A1 | 11/2001 | Cuervo |
| 2001/0054003 A1 | 12/2001 | Chien et al. |
| 2001/0054059 A1 | 12/2001 | Marks et al. |
| 2001/0056398 A1 | 12/2001 | Scheirer |
| 2002/0002479 A1 | 1/2002 | Almog et al. |
| 2002/0010627 A1 | 1/2002 | Lerat |
| 2002/0019803 A1 | 2/2002 | Muller |
| 2002/0023108 A1 | 2/2002 | Daswani et al. |
| 2002/0026418 A1 | 2/2002 | Koppel et al. |
| 2002/0029269 A1 | 3/2002 | McCarty et al. |
| 2002/0031230 A1 | 3/2002 | Sweet et al. |
| 2002/0032613 A1 | 3/2002 | Buettgenbach et al. |
| 2002/0032650 A1 | 3/2002 | Hauser et al. |
| 2002/0042808 A1 | 4/2002 | Smith et al. |
| 2002/0046255 A1 | 4/2002 | Moore et al. |
| 2002/0062235 A1 | 5/2002 | Wahlbin et al. |
| 2002/0069172 A1 | 6/2002 | Omshehe et al. |
| 2002/0077964 A1 | 6/2002 | Brody et al. |
| 2002/0077978 A1 | 6/2002 | O'Leary et al. |
| 2002/0087447 A1 | 7/2002 | McDonald et al. |
| 2002/0087471 A1 | 7/2002 | Ganesan et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0095443 A1 | 7/2002 | Kovack |
| 2002/0099936 A1 | 7/2002 | Kou et al. |
| 2002/0104878 A1 | 8/2002 | Seifert et al. |
| 2002/0111890 A1 | 8/2002 | Sloan et al. |
| 2002/0116271 A1 | 8/2002 | Mankoff |
| 2002/0120627 A1 | 8/2002 | Mankoff |
| 2002/0128977 A1 | 9/2002 | Nambiar et al. |
| 2002/0143703 A1 | 10/2002 | Razvan et al. |
| 2002/0143874 A1 | 10/2002 | Marquette et al. |
| 2002/0147662 A1 | 10/2002 | Anderson |
| 2002/0152163 A1 | 10/2002 | Bezos et al. |
| 2002/0156900 A1 | 10/2002 | Marquette et al. |
| 2002/0165820 A1 | 11/2002 | Anvekar et al. |
| 2002/0174010 A1 | 11/2002 | Rice, III |
| 2002/0174016 A1 | 11/2002 | Cuervo |
| 2002/0178113 A1 | 11/2002 | Clifford et al. |
| 2002/0198806 A1 | 12/2002 | Blagg et al. |
| 2003/0001888 A1 | 1/2003 | Power |
| 2003/0004828 A1 | 1/2003 | Epstein |
| 2003/0023549 A1 | 1/2003 | Armes et al. |
| 2003/0028518 A1 | 2/2003 | Mankoff |
| 2003/0034388 A1 | 2/2003 | Routhenstein et al. |
| 2003/0037131 A1 | 2/2003 | Verma |
| 2003/0040995 A1 | 2/2003 | Daddario et al. |
| 2003/0041165 A1 | 2/2003 | Spencer et al. |
| 2003/0046249 A1 | 3/2003 | Wu |
| 2003/0053609 A1 | 3/2003 | Risafi et al. |
| 2003/0055871 A1 | 3/2003 | Roses |
| 2003/0061168 A1 | 3/2003 | Routhenstein |
| 2003/0084002 A1 | 5/2003 | Ericson et al. |
| 2003/0085286 A1 | 5/2003 | Kelley et al. |
| 2003/0088489 A1 | 5/2003 | Peters et al. |
| 2003/0097574 A1 | 5/2003 | Upton |
| 2003/0101119 A1 | 5/2003 | Persons et al. |
| 2003/0105672 A1 | 6/2003 | Epstein et al. |
| 2003/0105981 A1 | 6/2003 | Miller et al. |
| 2003/0131357 A1 | 7/2003 | Kim |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0149594 A1 | 8/2003 | Beazley et al. |
| 2003/0154171 A1 | 8/2003 | Karp et al. |
| 2003/0163403 A1 | 8/2003 | Chen et al. |
| 2003/0163700 A1 | 8/2003 | Paatero |
| 2003/0167229 A1 | 9/2003 | Ludwig et al. |
| 2003/0172040 A1 | 9/2003 | Kemper et al. |
| 2003/0182246 A1 | 9/2003 | Johnson et al. |
| 2003/0187787 A1 | 10/2003 | Freund |
| 2003/0195808 A1 | 10/2003 | Brown et al. |
| 2003/0200180 A1 | 10/2003 | Phelan et al. |
| 2003/0204460 A1 | 10/2003 | Robinson et al. |
| 2003/0216965 A1 | 11/2003 | Libman |
| 2003/0218066 A1 | 11/2003 | Fernandes et al. |
| 2003/0225688 A1 | 12/2003 | Dobbins |
| 2004/0019563 A1 | 1/2004 | Sines et al. |
| 2004/0024672 A1 | 2/2004 | Brake, Jr. et al. |
| 2004/0029569 A1 | 2/2004 | Khan et al. |
| 2004/0030626 A1 | 2/2004 | Libman |
| 2004/0031856 A1 | 2/2004 | Atsmon et al. |
| 2004/0039588 A1 | 2/2004 | Libman |
| 2004/0049702 A1 | 3/2004 | Subramaniam et al. |
| 2004/0094624 A1 | 5/2004 | Fernandes et al. |
| 2004/0098351 A1 | 5/2004 | Duke |
| 2004/0111610 A1 | 6/2004 | Slick et al. |
| 2004/0117409 A1 | 6/2004 | Scahill et al. |
| 2004/0133787 A1 | 7/2004 | Doughty et al. |
| 2004/0146159 A1 | 7/2004 | Rosen |
| 2004/0149544 A1 | 8/2004 | Dal Ferro |
| 2004/0153378 A1 | 8/2004 | Perkowski |
| 2004/0159700 A1 | 8/2004 | Khan et al. |
| 2004/0162773 A1 | 8/2004 | Del Rey et al. |
| 2004/0186773 A1 | 9/2004 | George et al. |
| 2004/0210498 A1 | 10/2004 | Freund |
| 2004/0215507 A1 | 10/2004 | Levitt et al. |
| 2004/0215514 A1 | 10/2004 | Quinlan |
| 2004/0225880 A1 * | 11/2004 | Mizrah .................. G06F 21/46 713/155 |
| 2004/0230843 A1 | 11/2004 | Jensen |
| 2004/0232223 A1 | 11/2004 | Beenau et al. |
| 2004/0236688 A1 | 11/2004 | Bozeman |

(56) References Cited

U.S. PATENT DOCUMENTS

| | | | |
|---|---|---|---|
| 2004/0239481 A1 | 12/2004 | Beenau | |
| 2004/0243498 A1 | 12/2004 | Duke | |
| 2004/0252012 A1 | 12/2004 | Beenau et al. | |
| 2004/0254991 A1 | 12/2004 | Malik et al. | |
| 2005/0015588 A1* | 1/2005 | Lin | G06F 21/34 713/159 |
| 2005/0027649 A1 | 2/2005 | Cech | |
| 2005/0033619 A1 | 2/2005 | Barnes et al. | |
| 2005/0035847 A1 | 2/2005 | Bonalle et al. | |
| 2005/0040242 A1 | 2/2005 | Beenau et al. | |
| 2005/0055306 A1 | 3/2005 | Miller et al. | |
| 2005/0060579 A1 | 3/2005 | Dickelman et al. | |
| 2005/0071230 A1 | 3/2005 | Mankoff | |
| 2005/0071637 A1 | 3/2005 | Shirakawa | |
| 2005/0075932 A1 | 4/2005 | Mankoff | |
| 2005/0077349 A1 | 4/2005 | Bonalle et al. | |
| 2005/0080747 A1 | 4/2005 | Anderson et al. | |
| 2005/0082362 A1 | 4/2005 | Anderson et al. | |
| 2005/0086160 A1 | 4/2005 | Wong et al. | |
| 2005/0086177 A1 | 4/2005 | Anderson et al. | |
| 2005/0091126 A1 | 4/2005 | Junger | |
| 2005/0091138 A1 | 4/2005 | Awatsu | |
| 2005/0091492 A1 | 4/2005 | Benson et al. | |
| 2005/0116024 A1 | 6/2005 | Beenau et al. | |
| 2005/0120180 A1 | 6/2005 | Schornbach et al. | |
| 2005/0144450 A1* | 6/2005 | Voice | G06F 21/34 713/169 |
| 2005/0171898 A1 | 8/2005 | Bishop et al. | |
| 2005/0193056 A1 | 9/2005 | Schaefer et al. | |
| 2005/0193208 A1 | 9/2005 | Charrette et al. | |
| 2005/0206499 A1 | 9/2005 | Fisher | |
| 2005/0216421 A1 | 9/2005 | Barry et al. | |
| 2005/0278641 A1 | 12/2005 | Mansour et al. | |
| 2005/0289051 A1 | 12/2005 | Allin et al. | |
| 2006/0005039 A1 | 1/2006 | Hsieh | |
| 2006/0029261 A1 | 2/2006 | Hoffman et al. | |
| 2006/0036553 A1 | 2/2006 | Gupta et al. | |
| 2006/0041540 A1 | 2/2006 | Shannon | |
| 2006/0116949 A1 | 6/2006 | Wehunt et al. | |
| 2006/0173706 A1 | 8/2006 | Allin et al. | |
| 2006/0249574 A1 | 11/2006 | Brown et al. | |
| 2006/0259766 A1 | 11/2006 | Rasti | |
| 2006/0261927 A1 | 11/2006 | Kelly et al. | |
| 2006/0271397 A1 | 11/2006 | Allin et al. | |
| 2006/0271477 A1 | 11/2006 | Allin et al. | |
| 2006/0271478 A1 | 11/2006 | Allin et al. | |
| 2006/0271479 A1 | 11/2006 | Allin et al. | |
| 2006/0271480 A1 | 11/2006 | Allin et al. | |
| 2006/0274970 A1 | 12/2006 | Seki et al. | |
| 2007/0019806 A1 | 1/2007 | Conley et al. | |
| 2007/0034700 A1 | 2/2007 | Poidomani et al. | |
| 2007/0078771 A1 | 4/2007 | Allin et al. | |
| 2007/0136211 A1 | 6/2007 | Brown et al. | |
| 2007/0156521 A1 | 7/2007 | Yates | |
| 2007/0186252 A1 | 8/2007 | Maggio | |
| 2007/0203850 A1 | 8/2007 | Singh et al. | |
| 2007/0208671 A1 | 9/2007 | Brown et al. | |
| 2007/0215688 A1 | 9/2007 | Routhenstein | |
| 2007/0234408 A1 | 10/2007 | Burch et al. | |
| 2007/0265924 A1 | 11/2007 | Schwarz | |
| 2008/0010202 A1 | 1/2008 | Schwarz | |
| 2008/0184315 A1 | 7/2008 | Ellis et al. | |
| 2009/0043651 A1 | 2/2009 | Schwarz | |
| 2009/0100508 A1 | 4/2009 | Labaton | |
| 2009/0192940 A1 | 7/2009 | Mann, III et al. | |

FOREIGN PATENT DOCUMENTS

| | | |
|---|---|---|
| EP | 0855659 | 7/1998 |
| EP | 959440 | 11/1999 |
| EP | 1014318 A2 | 6/2000 |
| EP | 1022664 | 7/2000 |
| EP | 1056043 | 11/2000 |
| EP | 1089516 | 4/2001 |
| GB | 2275654 | 9/1994 |
| GB | 2376787 | 12/2002 |
| GB | 2377071 | 12/2002 |
| GB | 2377314 | 1/2003 |
| JP | H10-187467 | 7/1998 |
| JP | 2003-24329 | 11/2000 |
| JP | 2001-134672 | 5/2001 |
| JP | 2005-242976 | 9/2005 |
| WO | WO 94/29112 | 12/1994 |
| WO | WO 97/41673 | 11/1997 |
| WO | WO 9810368 | 3/1998 |
| WO | WO 99/05633 | 2/1999 |
| WO | WO 99/40507 A1 | 8/1999 |
| WO | WO 01/18656 A1 | 3/2001 |
| WO | WO 01/69347 A2 | 9/2001 |
| WO | WO 01088659 | 11/2001 |
| WO | WO 01088659 A3 | 11/2001 |
| WO | WO 02/17082 A1 | 2/2002 |
| WO | WO 2004-079603 | 9/2004 |
| WO | WO 2005/043277 A2 | 5/2005 |
| WO | WO 2005-101975 | 11/2005 |
| WO | WO 2006-011904 | 2/2006 |
| WO | WO 2006-011904 A3 | 2/2006 |
| WO | WO 2006-060370 | 6/2006 |
| WO | WO 2006-105092 | 10/2006 |
| WO | WO 2006-116772 | 11/2006 |

OTHER PUBLICATIONS

Alshawi, M et. al., An IFC Web Based Collaborative Construction Computer Environment Wisper, Sep. 1999.
Fusaro, Roberta, Builders Moving to Web tools Computerworld, Nov. 16, 1998, vol. 32, No. 46, pp. 51, 53.
Microsoft, CNBC on MSN Money Microsoft Money 2003 Deluxe, Aug. 2002.
Marlin, Chasing Document Management, Inform, vol. 13, No. 4, Apr. 199, p. 76-82.
Construction Financing to Build Your Own Home, ISBN 0962864307, Jul. 1990.
Seibert, Paul, Facilities Planning & Design for Financial Institutions Bankline Publications, 1996, ISBN 1-55738-780-X (1996).
Owen, David, Facilities Planning & Relocation RSMeans, ISBN 0-87629-281-3 (1993).
Larsen, Amy, Internet goes to Work for Builders, InterWeek, Nov. 16, 1998, Issue 741.
Radosevich, Is Work Flow Working?, CNN.com, Apr. 6, 1999 at <http//www.cnn.com/TECH/computing/9904/06/workflow/ent.idg, p. 1 of 5, retrieved from the internet on Nov. 28, 2005.
Frank, John N. Frank, Beyond Direct Mail, Credit Card Management, vol. 9, Iss. 5, Aug. 1996, 4 pgs.
Kilian-Kehr, Roger, Kilian-Kehr, Mobile Security with Smartcards, Dissertation, Apr. 8, 2002 (Summary Only).
Mary C. Lacity, et al., Mary C. Lacity, et al., The Information Systems Outsourcing Bandwagon, Sloan Management Review, vol. 35, No. 1, Fall 1993, p. 73-86.
Omware, Inc., Web Pages, Feb. 2000, Retrieved from http//web.archive.org/web20000226033405/www.omware.com/products.html, Retrieved from the internet on Nov. 28, 2005.
Youll, James, Peer to Peer Transactions in Agent Mediated Electronic Commerce, Aug. 10, 2001.
Point for Windows Version 3.x Interface Marketing Guide.pdf (1999).
Primavera Expedition User Guide (1998).
Primavera Systems Delivers Expedition Express,Business Wire, Feb. 23, 1999.
Van Collie, Shimon Craig, Problem Disbursement Control Needed Construction Loan Tool from PriMerit NewTrend, Apr. 1990.
Deckmyn, Dominique, San Francisco manages $45M project via web-based Service, Computerworld, Aug. 9, 1999, vol. 33, No. 32, p. 14.
Mosig, Richard, Software Review the Construction Project Manager Cost Engineering, Jan. 1996, vol. 38, No. 1, pp. 7-8.
Hernandez, Tomas et al., Software Solutions, Building Design & Construction, Nov. 1999, vol. 40, No. 11, pp. 38-40.

(56) References Cited

OTHER PUBLICATIONS

Taylor, Telecommunications Demand Analysis in Transition, Proceedings of the 31st Hawaii International Conference on System Sciences, vol. 5, Jan. 6-9, 1998, pp. 409-415.
Brown, Keith, The Buiders Revolution, Internet Archive Wayback Machine, Jan. 1998.
Cotts, David, The Facility Management Handbook Second Edition AMACM, ISBN 0-8144-030-8 (1999).
Carden, Philip, The New Face of Single Sign-on, Network Computing, http//www.networkcomputing.com, printed Dec. 29, 2000, 4 pages.
Yee, Bennet, Using Secure Coprocessors, May 1994.
5500—FDIC General Counsel's Opinion No. 8—Stored Value Cards, 61 Fed. Reg. 40490, http://www.fdic.gov/regulations/laws/rules/5500-500.html, Aug. 2, 1996.
Song, A Card That Asks for ID, Time Magazine, Apr. 12, 2004, 1 page.
A Store Card Issuer Looks for Lift from Electronic Gift Certificates, Credit. Card News, Feb. 1, 1995, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CESNaBANCO introduces stored value card technology blockbuster video is first merchant partner.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.

Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Konrad, IBM Had a Bunch of Unusual Ideas in 2003, www.philly.com, printed Jan. 21, 2004, posted on Jan. 13, 2004, 2 pages.
Incentive Firms Find Debit Cards a Rewarding Experience (Off-line debit card issuers converge efforts with companies looking for effective incentives to boost employee productivity and to motivate individuals to buy their products), Debit Card News, vol.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Clark, Microsoft, Visa to Jointly Develop PC Electronic-Shopping Software, The Wall Street Journal, Nov. 9, 1994, Nov. 9, 1994 WSJ B9.
More Retailers Turn to Co-Branding, Chain Store Age Executive with Shopping Center Age, Feb. 1, 1995, 3 pages.

(56) References Cited

OTHER PUBLICATIONS

Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number For All Calls, AT&T Marketing, News Release, www.att.com/press/0297/970217.csa.htm, Feb. 17, 1997, 2 pages.
Payment data, www.paymentdata.com, Mar. 5, 2004.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p. 1(25), ISSN: 1069-7225, 17 pages.
Lzarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
Stoughton, The Gift of Credit, www.washingtonpost.com/wp-srv/business, Dec. 14, 1998.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, Swiftgift, www.swiftgiftcard.com, Dec. 8, 1998, 10 pages.
Machlis et al., Will smart cards replace ATMs?, Computerworld, printed Feb. 23, 2001, 3 pages.
Schwab, Charles, Now 7 Ways for a better Total Return for Your Money; Schwat 1, The Inventor's Asset Management Account, Charles R. Schwab, Charles Schwab & Co., Inc., 16 pages.
Smart Cards: Big Brother's Little Helpers, The Privacy Committee of New South Wales, No. 66, Aug. 1995.

\* cited by examiner

SYSTEMS AND METHODS FOR MULTIFACTOR AUTHENTICATION

RELATED APPLICATIONS

This application is a Continuation (CON) of U.S. patent application Ser. No. 11/137,409, filed May 26, 2005, which is a Continuation-in-Part (CIP) application of U.S. patent application Ser. No. 10/419,107 filed Apr. 21, 2003, now U.S. Pat. No. 7,899,753, which is a Continuation-in-Part (CIP) application of U.S. patent application Ser. No. 10/105,471 filed Mar. 25, 2002, the disclosures of each of which incorporated by reference into the present application in its entirety.

The subject matter of this application is related to the subject matter of U.S. Provisional Application Ser. No. 60/646,622 filed Jan. 26, 2005, assigned or under obligation of assignment to the same entity as this application, from which application priority is claimed for the present application. The subject matter of this application is also related to the subject matter of U.S. Provisional Application Ser. No. 60/661,488 filed Mar. 15, 2005, assigned or under obligation of assignment to the same entity as this application, from which application priority is claimed for the present application. Provisional application U.S. Ser. No. 60/646,622 and Provisional application U.S. Ser. No. 60/661,488 are both incorporated herein by reference in their entirety.

BACKGROUND OF THE INVENTION

Authenticating people, particularly remotely, has been a difficult operation to make resistant to attack. Since single authenticating techniques are vulnerable to theft, it has become attractive to various groups to devise ways to do multi factor authentication, where more than one of (something you have, something you know, something you are) is used in demonstrating the identity of a person whose identity is to be established.

Typically, doing this has involved using relatively complex or expensive devices such as cards with keyboards on them (where you authenticate to the card and then use it), fingerprint readers, or digital certificates requiring public/private encryption to validate the presenter is in possession both of a password and of a private key.

All this complexity has delayed widespread use of such systems, since the cost of giving out hundreds of millions of copies of them has been kept high by the need to authenticate two or more things, and the cost of building the system components.

SUMMARY AND BRIEF DESCRIPTION OF THE INVENTION

The invention provides an authentication system and method. In particular, the invention provides a method for performing a financial authentication utilizing a token associated with a user, the method comprising the token generating a set of display characters that are viewable by the user, the token generating the display characters using logic; the user transforming a portion of the set of display characters using a transformation process, based on knowledge of the user, so as to form a display character sequence; the user outputting the display character sequence to an authentication entity; and the authentication entity authenticating the display character sequence using the logic and knowledge of the transformation.

BRIEF DESCRIPTION OF THE DRAWINGS

The present invention can be more fully understood by reading the following detailed description together with the accompanying drawings, in which any like reference indicators are used to designate like elements, and in which.

DETAILED DESCRIPTION OF THE INVENTION

Hereinafter, various aspects of embodiments of the invention will be described. As used herein, any term in the singular may be interpreted to be in the plural, and alternatively, any term in the plural may be interpreted to be in the singular.

What is proposed here is a system and method which provides a form of two factor authentication which resists theft of the authentication tokens even by someone who can intercept the authentication messages in total, in accordance with one embodiment of the invention. The invention can be supported using relatively very simple hardware.

Figure 1:
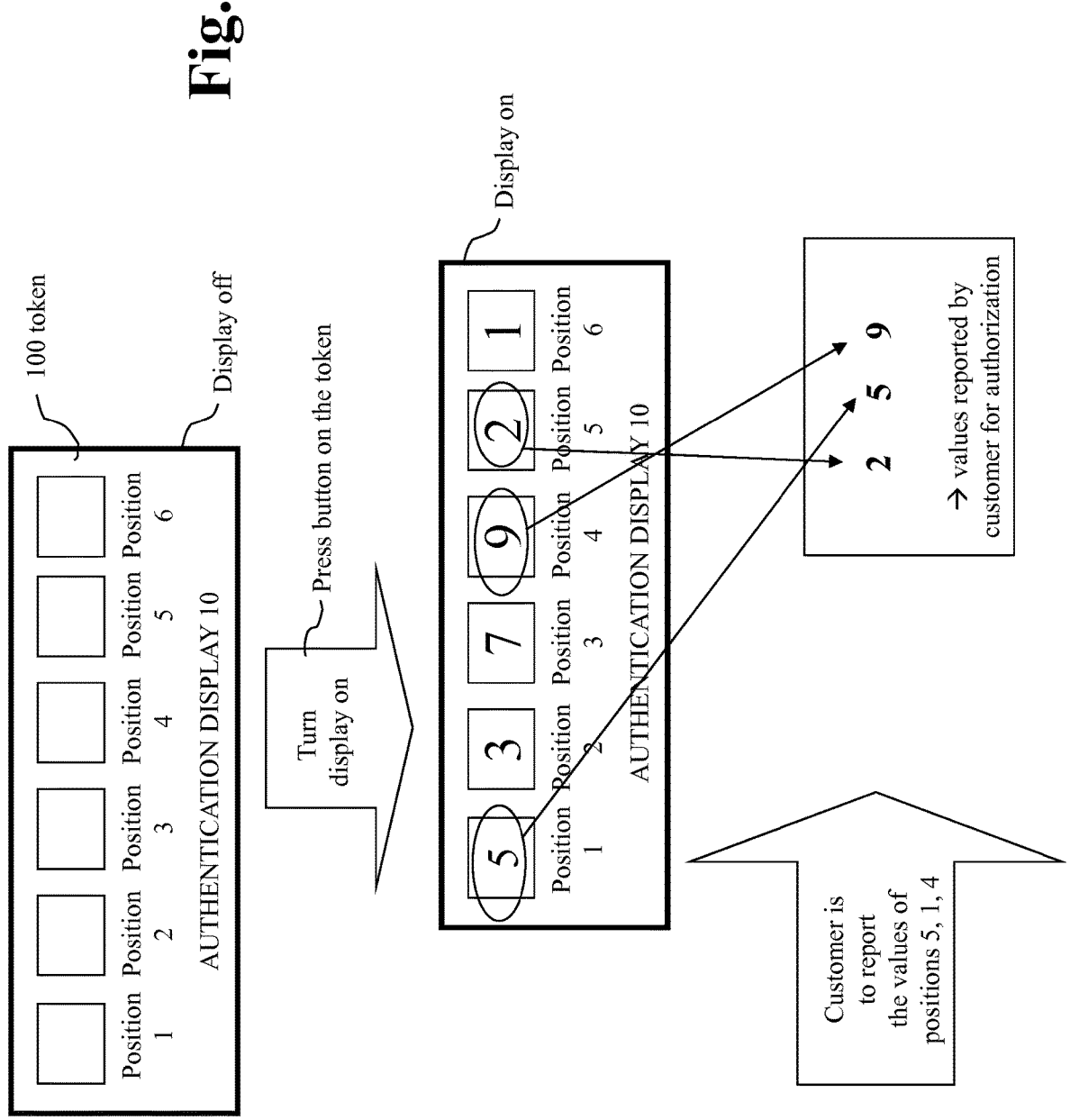
FIG. 1 is a diagram showing aspects of an encryption process in accordance with one embodiment of the invention.

One embodiment uses a token which displays numbers that change (either with time or with uses, but in ways that cannot be easily predicted by observation) but whose values can be tracked and predicted by an authenticating authority (who issued the tokens generally). In accordance with one embodiment of the invention, the token will display a set of numbers which will have their positions labeled (e.g., 1 through 6, for a 6 digit display). FIG. 1 is a diagram illustrating such a token 100.

In accordance with one embodiment of the invention, a customer will be told ahead of time, "choose three positions of the display 10, as shown in FIG. 1, you will select in order, and remember the positions and order you picked." The customer authenticates by getting his token to display a new set of numbers (which should change so that their values are effectively unpredictable), and then to report the values in the three positions he chose and told the authenticating authority about earlier.

FIG. 1 shows the display of the token 100 in an "off" position. Once the customer activates the display in some manner, i.e., pushes a button, the token is turned on, and numbers are seen on the display. Thus, as shown in FIG. 1, suppose the display 10 reads:

5 3 7 9 2 1 and the customer decided to report position 5, 1, and 4 in that order. The customer would then transmit the 5th, 1st, and 4th digits in order: 2 5 9

Note that this authenticates the customer as an individual since the customer demonstrates that he knows the pattern registered earlier, but also it shows the customer has the token he was given. Thus, at a stroke he has provided a two factor authenticator. Note too that someone who can see the digits sent cannot replay them usefully. That person does not know the pattern, nor does she have the token, and she must have both to use the token successfully.

In accordance with one embodiment of the invention, another set of labels may be provided under the display, like 01, 23, 45, 67, 89. In processing a transaction, the customer is asked, later in a transaction, to encode a few digits of the transaction amount as positions of the display, and then requested to transmit the digits. This too can be easily verified by a payment processor (who has the amount as part of a payment record), and it shows that someone with the token agreed to the payment amount. In effect, this is a signing by the customer (who would have authenticated as an individual moments before with the same token) of the transaction amount. Similarly, any external observer will be unable to deduce any of this from the digits transmitted. The customer may be told what the purchase amount is. Accordingly, for example, if the customer is told the purchase amount was $872.00, the customer would report the characters shown in the position five, position five and position two, i.e., if the display was labeled 0, 1-2, 3-4, 5-6, 7-8, 9.

Figure 11:
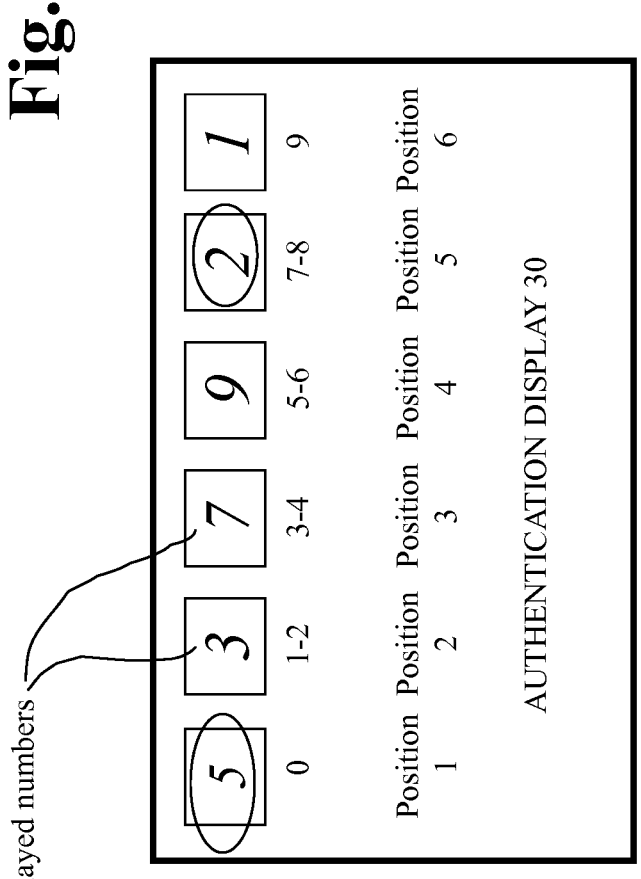
FIG. 11 is a diagram showing further aspects of an encryption process relating to a purchase amount in accordance with one embodiment of the invention.

In further illustration, FIG. 11 shows a token 30 so labeled. In this example, the displayed number is 5 3 7 9 2 1. Accordingly, with a purchase amount of $872, the customer would report the displayed numbers in the positions, 5, 5, 2, i.e., the customer would report the numbers 2 2 3. In this manner, an authentication entity can confirm that the customer indeed knows what the customer is agreeing to, e.g., a dollar amount. It is appreciated that such processing adds complexity, but may be desired in some circumstances, e.g., in high dollar transactions. To reduce the complexity, a prompt screen might be provided to the customer so as to take them through the process, e.g., a window on a web page.

It is appreciated that an alternative data manipulation that can be done by the user-customer could be used here instead of the pattern selection described above. That is, the customer does need to manipulate the displayed numbers in some manner known to him (and the authenticating authority) so as to generate an output from such manipulation. However, the selection scheme described above may be desirable since it appears easy to use and remember by the customer In implementation of the invention, it is not needed that numbers be used on the display. That is, any of a wide variety of graphics, letters, symbols, glyphs, runes, images or other indicia, for example, might be used in lieu (or in combination) with numbers.

It should be appreciated that the various features of the present invention may be used in conjunction with other encryption technology and/or features. In particular, the various features of the present invention may be used in combination with any of the features described in U.S. patent application Ser. No. 10/419,107 filed Apr. 21, 2003, which is incorporated herein by reference in its entirety.

In explanation of further aspects, in accordance with one embodiment of the invention, the problem being addressed is in the area of authentication. Authentication of customers to a bank is vital since the entire business is involved with caring for other peoples' money and using it per their instructions. If the owners cannot be identified, their instructions cannot be followed and the business collapses. When trying to identify people over computer links, this is harder than otherwise. One of the major issues is that spyware and other man in the middle attacks on information passed for authentication are very common. By providing people with a token that can produce an effectively random number which an authority can compute as well, anytime it is needed, people might be able to prove clearly that they have the token. Unfortunately, theft of tokens (even from the mails) is also common. It is desirable in addition to know for high value transactions that one is dealing with the person who claims to be dealing with you rather than knowing only that whoever you are dealing with has the person's token. Moreover, while it is common practice just to ask for another password or PIN (personal identification number), these are all too easily intercepted. The proposed scheme here solves those problems.

Hereinafter, the invention will be described from a further perspective, in accordance with one embodiment. Given that two parties who must authenticate one to the other both have means to generate an effectively random number (which means it is computationally infeasible to compute the next such number from the prior ones without a secret shared by the two) which can nevertheless be generated by both and tracked so that the one doing the authentication can (1) figure out the value the other one has, (2) find some transformation of the number or part of it which can be easily done by hand, and (3) have both parties agree to this transform (which can be thought of as a simple encryption) ahead of time. Now when the one not doing the authentication needs to authenticate the other, make sure they have generated a "random" number and have the one being authenticated perform the agreed on operation and report the value thereof. This may be as simple as picking an order in which to report several of the digits of the random number, as described above. Then, the one doing the authentication performs the same transform on his copy of the random number and checks if the value is correct. Note that anyone observing the numbers picked will see only the random numbers, not the secret method by which they were produced, and thus will have nothing very useful in attempting a replay or PIN theft.

To explain further, the ideas of doing a second encryption, and that of permuting numbers or using a Caesar cipher, are old. However, the scheme here, because it is used with effectively random numbers, is much stronger than a permutation or Caesar cipher or other hand encryption method because of the absence of usable order in the material being encoded. An attacker must solve a cipher on a "plaintext" random number which in general is generated every time needed and used once. This makes it exceedingly difficult for a man in the middle to steal the person's authentication. Also, whatever token system is used to provide the pseudo random numbers and track them or synchronize them needs no additional complexity. This makes the scheme more cost effective than systems using conventional passwords or PINs, digital certificates, and other such complexities.

Figure 2:
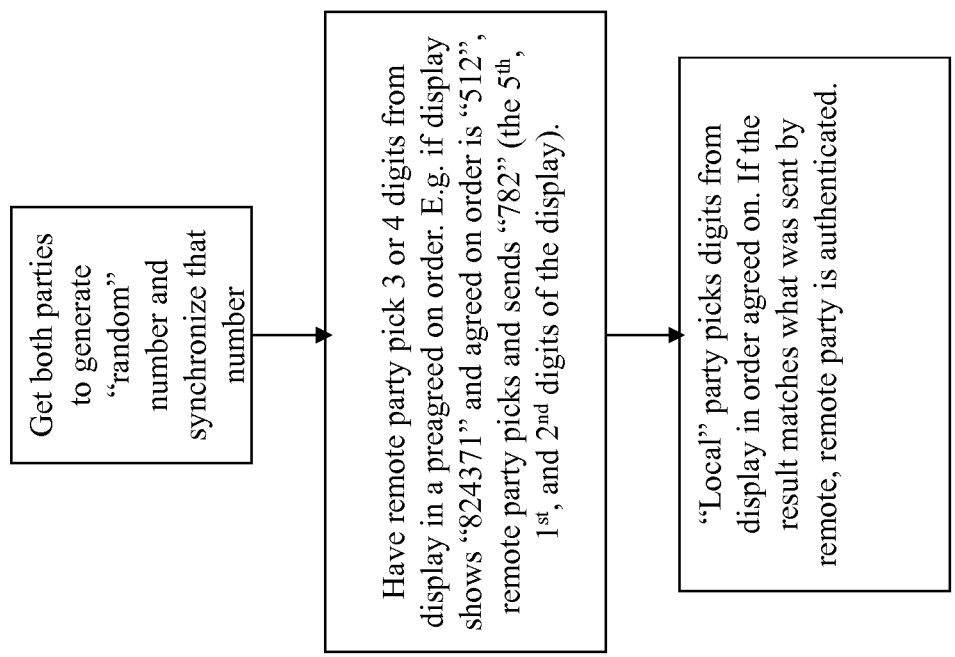
FIG. 2 is a flowchart showing further aspects of the encryption process in accordance with one embodiment of the invention.

FIG. 2 is a flowchart in accordance with one embodiment of the invention. As shown, the present invention provides a novel way to authenticate a customer or other person.

The invention might be compared to a known one-time pad. One time pad cryptography is usually illustrated with the pad values being XORed with data. In effect, embodiments of the invention perform an encryption hand operation on display characters displayed by a token. As shown in the example of FIG. 2, if the "random number" choices are changed appropriately, we could produce 3 digit outputs from 000 to 999, i.e., the entire range possible. This means we may have no test possible to pick the correct key as an observer in the middle. This makes the operation the user undertakes (which might be the illustrated permutation or anything else convenient) far stronger than what the same operation on normal text might be. The user operation remains a simple one, but the fact that it operates on one time data which is effectively random makes it basically as strong as the randomness. Where the cipher and key are well chosen which may be used for computing the numbers to be synchronized the resulting ciphertext may be treated as random and the discussion above holds.

Figure 3:
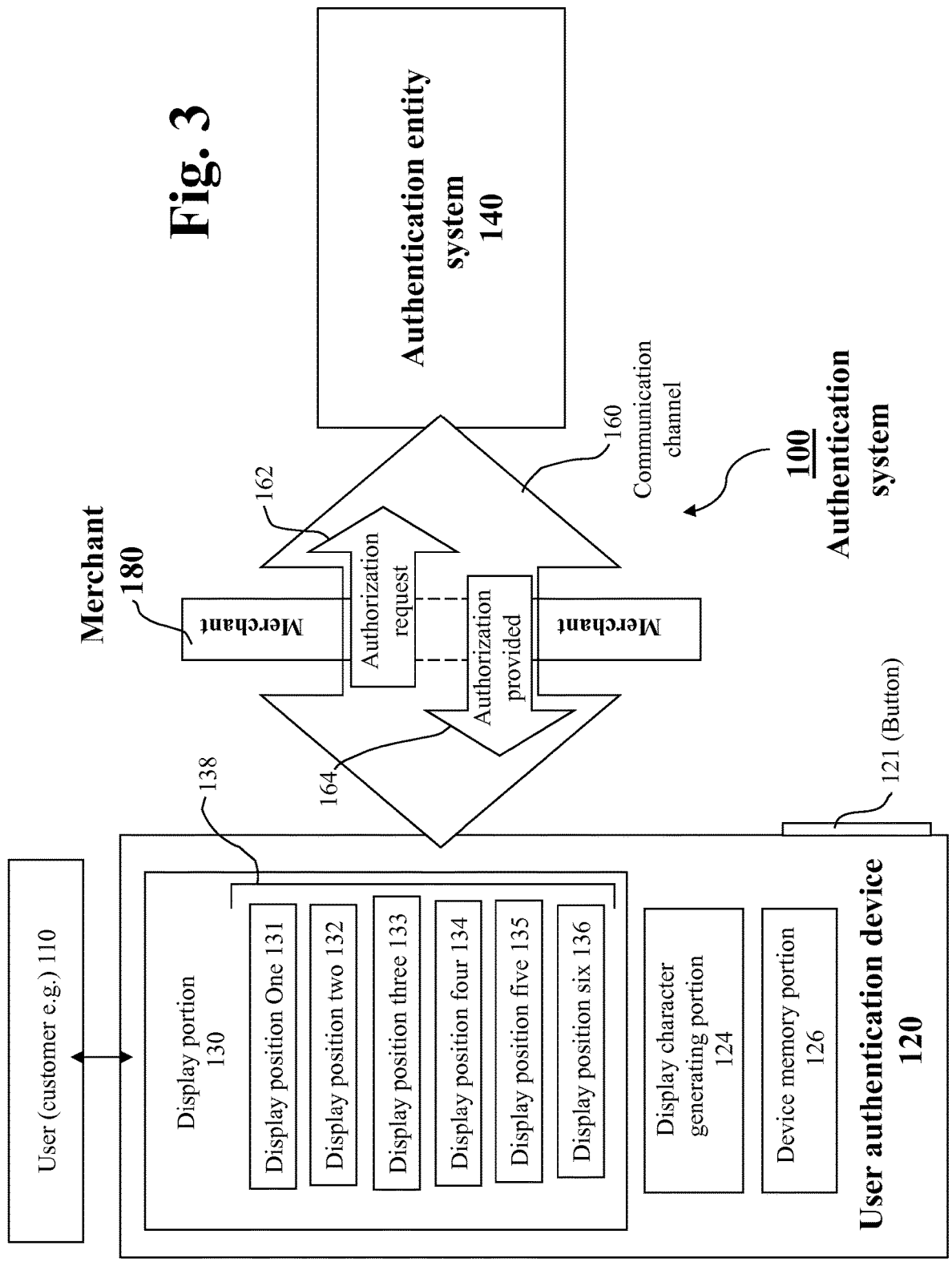
FIG. 3 is a block diagram showing an authentication system in accordance with one embodiment of the invention.

FIG. 3 is a block diagram showing an authentication system 100 in accordance with one embodiment of the invention. The authentication system 100 includes a user authentication device 120. The user authentication device 120 may be in the form of a token, for example. The user authentication device 120 provides the user with display characters (for example numbers) 192 (see FIG. 3) that are used by the user to effect an authentication, as discussed below.

As shown in FIG. 3, the user authentication device 120 includes a display character generating portion 124 and a display portion 130. The display portion 130 includes a pluarality of display positions 138, i.e., display positions (131-136). Each display position 138 is a display, i.e., such as an LCD display, that displays a number, or any other character, so as to be visually observed by a user 110, in accordance with one embodiment of the invention.

The display character generating portion 124 generates the characters that are displayed in the display portion 130. In particular, the display character generating portion 124 uses predetermined logic (i.e., a suitable algorithm) to populate the display positions 138. This logic provides a predetermined progression of numbers, or other characters, that may be similarly generated by an authentication entity system 140.

In accordance with one embodiment of the invention, the user authentication device 120 has a button 121, which may be pressed by a user 110. Upon pressing the button 121, the display character generating portion 124 generates the characters that are displayed in the display portion 130. Accordingly, the user 110 interfaces with the user authentication device 120 using the button and visually, in accordance with one embodiment of the invention.

The user authentication device 120 further includes a device memory portion 126. The device memory portion 126 serves as a memory or database, as is needed to perform the various functions of the user authentication device 120.

As shown in FIG. 3, the authentication system 100 also includes an authentication entity system 140 and an illustrative merchant 180. Illustratively, the user 110 (using the user authentication device 120) interfaces with the merchant 180 so as effect a desired transaction. The transaction might be over the telephone, the Internet, or any other communication channel, as desired.

Accordingly, the systems and methods of embodiments of the invention may be used in any "transaction", including a conveyance of information, in which authentication of a user is needed or desired. Such transaction might include a telephone transaction, Internet transaction (such as an Internet purchase), network transaction, infrared transaction, radio signal transaction, credit card transaction, debit card transaction, smart card transaction, ACH transaction, stock trade transaction, mutual fund transaction, swap, PAYPAL® transaction, BILL ME LATER® transaction, electronic funds transfer transaction, financial application transaction, an arrangement to set up payments to an entity, a verification, an ATM transaction, and/or a message, for example. For example, such a transaction might include a message from one human user to another human user, a human user communicating with an electronic device, and/or two electronic devices communicating with each other. The transaction may or may not be in a financial context, i.e., for example, the message might be authorizing the opening of a door or the transfer of a non-financial related message, for example.

Accordingly, FIG. 3 shows a communication channel 160 over which the transaction is performed. The communication channel 160 carries an authorization request 162. Subsequent to the request being processed by the authentication entity system 140, the communication channel 160 then carries an authorization 164, in the example of FIG. 3. However, it is of course appreciated that the authentication entity system 140 might alternatively not authorize the requested transaction. As shown in FIG. 3, the authorization request 162 and the provided authorization is passed through the merchant 180. However, in an alternative embodiment, the authorization request 162 and/or the authorization provided 164 might be communicated to the authentication entity system 140 in some other manner, such as by some third party, and not via the merchant 180. Further, it is appreciated that the user authentication device 120 need not take on the form of the device shown in FIGS. 1 and 3, for example. That is, for example, the user authentication device 120 might be in the form of a software program running on a computer, or in some other alternative form.

Figure 4:
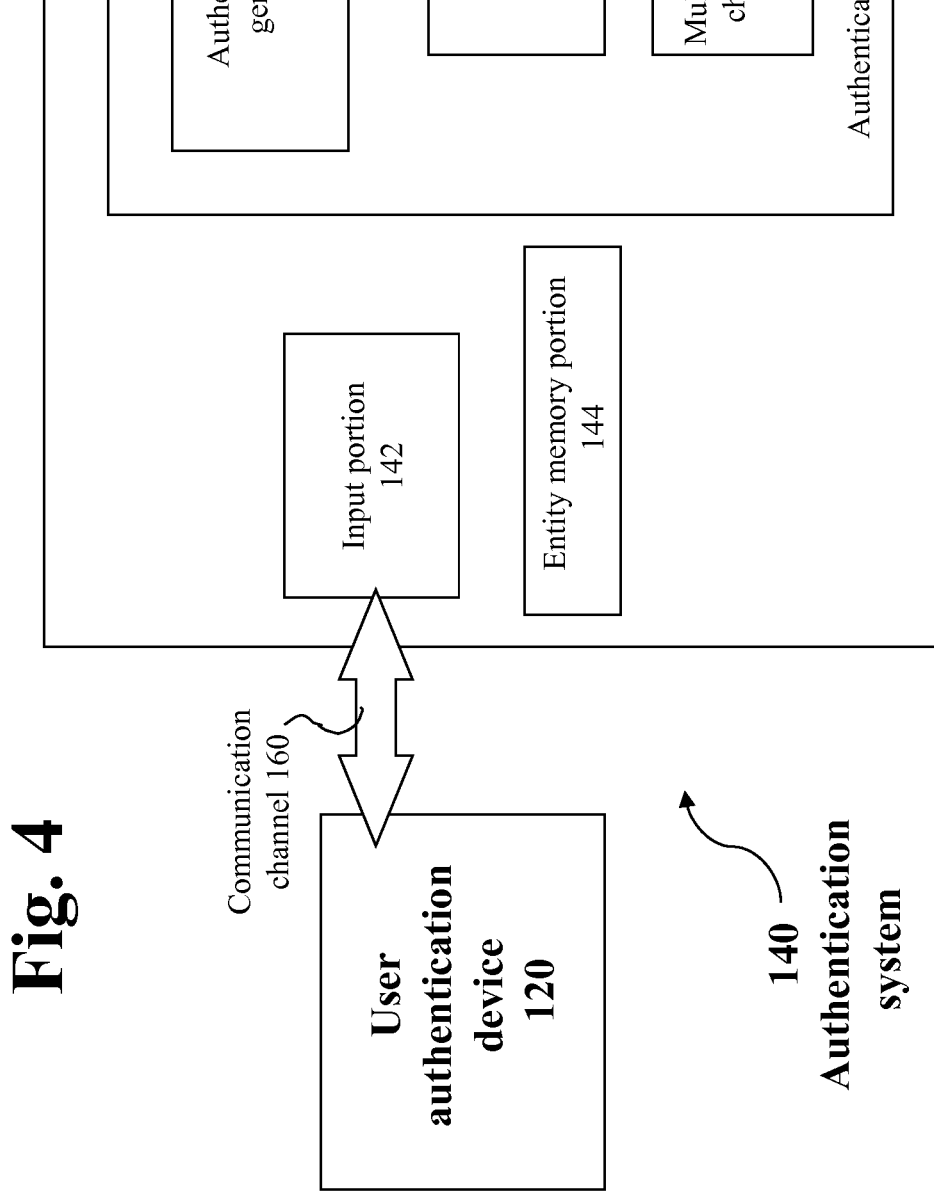
FIG. 4 is a block diagram showing further details of an authentication system, and in particular the authentication entity system, in accordance with one embodiment of the invention.

FIG. 4 is a block diagram showing further details of the authentication entity system 140. The authentication entity system 140 includes an input portion 142 and an entity memory portion 144. The input portion 142 interfaces with the communication channel 160 so as to communicate data, i.e., such as the authorization request 162 and the authorization provided 164 information. The entity memory portion 144 serves as a database to store various data associated with, and needed by, operation of the authentication entity system 140.

The authentication entity system 140 also includes an authenticating processing portion 150. The authenticating processing portion 150 performs the various processing of the authentication entity system 140. In particular, the authenticating processing portion 150 includes an authenticator character generating portion 152 and a comparison portion 154. The authenticator character generating portion 152 generates an authorizing character sequence 198 to be used to authenticate the transaction initiated by the user 110. In turn, the comparison portion 154 performs a comparison between the authorizing character sequence 198 (generated by the authenticator character generating portion 152) and the display character sequence 194 (provided by the user-customer).

Figure 5:
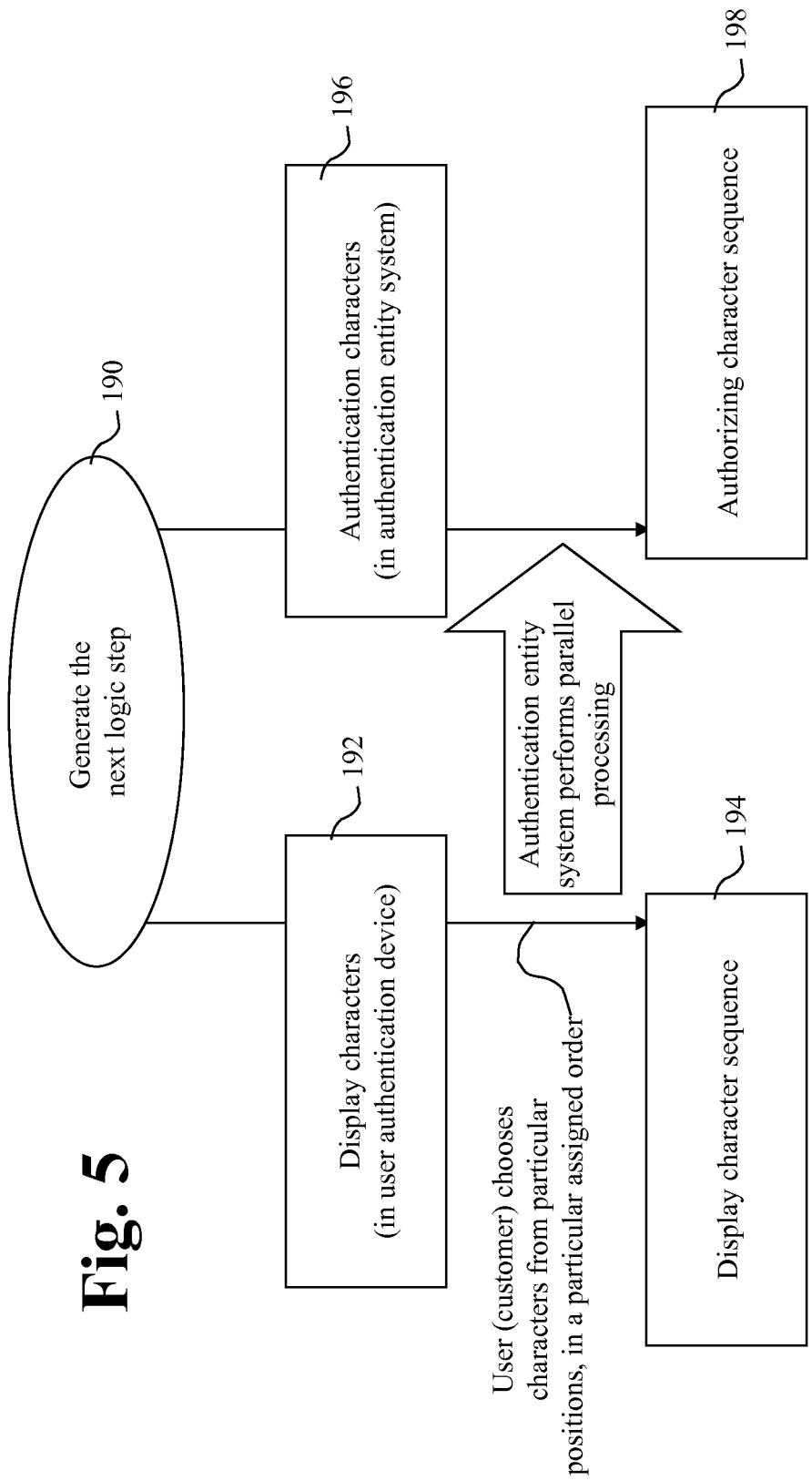
FIG. 5 is a diagram showing processing associated with display characters in accordance with one embodiment of the invention.

FIG. 5 is a diagram showing further features in accordance with one embodiment of the invention. Specifically, FIG. 5 shows aspects of the generation and the manipulation of the display characters 192 (generated by the display character generating portion 124) and the authentication characters 196 (generated by the authenticator character generating portion 152). Both the portions (124, 152) use the same logic (i.e., random logic as described above) to generate sets of characters (192, 196) in some predetermined manner. That is, the display character generating portion 124 will generate the same characters as the authenticator character generating portion 152 in a progressive manner. As used herein, the generation of a new set of characters by the portions (124, 152) is characterized as generating the next "logic step". To explain in other words, the display characters 192 associated with a particular logic step, will be the same as the authentication characters 196, if for the same logic step, in accordance with one embodiment of the invention. Thus, the particular logic step (that each of the display character generating portion 124 and the authenticator character generating portion 152 are at) will dictate the particular set of characters that are generated.

As described in detail herein, once the display characters 192 are generated on the user authentication device 120, the user observes only the particular display positions 138 that the user is assigned, i.e., the user might make this choice upon activation of the user authentication device 120. As described in the example above, the user might have picked the 1, 4 and 5 positions to be the selected positions (from which the user 110 actually uses the characters). The user 110 then orders the select display characters 192 in a predetermined manner. In particular, FIG. 1 described above shows an example of this ordering. Once the selected display characters are ordered, this results in a "display character sequence" 194, as used herein. It is this display character sequence 194 that is submitted to authenticate the desired transaction, in accordance with one embodiment of the invention in which ordering is used as the transformation to the display characters 192.

In a parallel manner to the user 110, the authentication entity system 140 generates authentication characters 196, selects particular authentication characters 196 as agreed upon with the customer, and then orders the selected authentication characters 196. In this manner, the authentication entity system 140 generates a sequence of characters (e.g. a number) that may be compared with the display character sequence 194 (submitted by the user/customer).

It is appreciated that the authentication entity system 140 may perform variations on the above processing methodology. That is, the authentication entity system 140 may not in fact generate all the authentication characters 196, but rather only the select authentication characters 196 that will indeed be used in the ordered set, which constitutes the authorizing character sequence 198. This approach might somewhat limit needed processing since the authentication entity system 140 is of course aware that only select characters in the authentication characters 196 will indeed be used. However, this approach would generally not be performed with the user authentication device 120, since the inclusion of all the display characters 192 (and subsequent disregarding of some of the display characters 192 by the user 110) is part of the encryption process.

Figure 6:
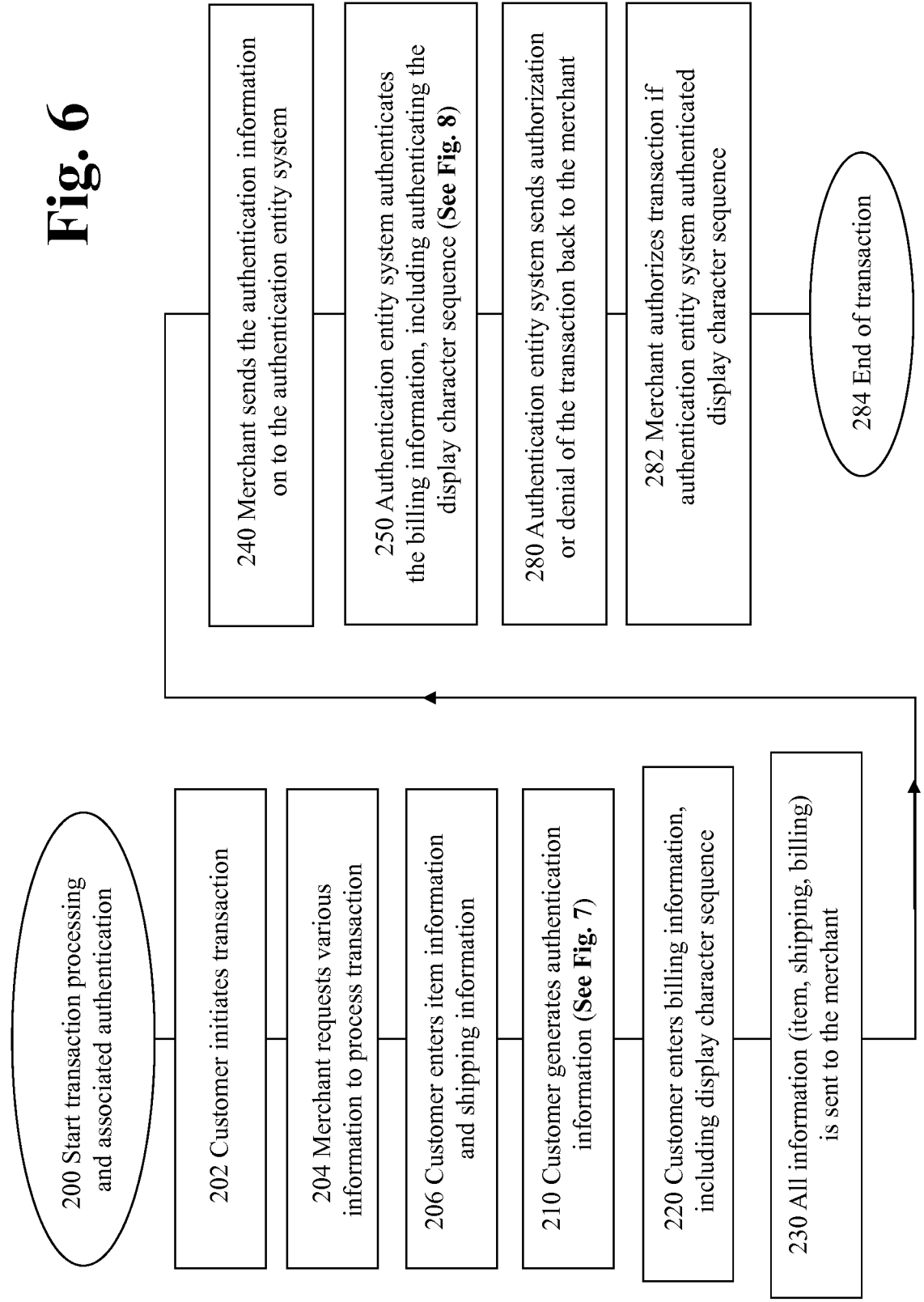
FIG. 6 is a high level flowchart showing an authentication process in accordance with one embodiment of the invention.

In further explanation of the invention, FIG. 6 is a high level flowchart showing an authentication process in accordance with one embodiment of the invention. As shown in FIG. 6, the process starts in step 200. Then, in step 202 in this example, the customer initiates a transaction. In this example, the transaction is with a merchant. After step 202, the process passes to step 204.

In step 204, the merchant requests various information from the customer so as to process the transaction. Accordingly, in step 206, the customer enters item information, i.e., regarding the particular item that the customer is purchasing, and shipping information. It should of course be appreciated that the merchant may request, and the customer may enter, any of a variety of desired information. After step 206 of FIG. 6, the customer prepares billing information. Specifically, in step 210, the customer generates authentication information to accompany the customer's submission of other billing information. Further details of step 210 are described in conjunction with FIG. 7 below.

Then, in step 220 of FIG. 6, the customer enters the billing information including authentication information, i.e., including a display character sequence for use by an authentication entity system in authenticating the transaction. After step 220, the process passes to step 230 of FIG. 6.

In step 230, all the information (item, shipping, billing) that the customer has prepared is sent to the merchant. Then, in step 240, the merchant sends the authentication information on to the authentication entity system, i.e., for authentication of the transaction that the customer is requesting the merchant to process. Then in step 250, the authentication entity system authenticates the billing information, including authenticating the display character sequence that the customer has provided. Further details of step 250 are described below with reference to FIG. 8.

After step 250 of FIG. 6, the process passes to step 280. In step 280, the authentication entity system sends authorization, or alternatively denial, of the transaction back to the merchant. Then, the process passes to step 282. In step 282, the merchant authorizes the transaction if the authentication entity system authenticated the display character sequence. It is appreciated that other authentication processing may accompany the authentication of the customer's display character sequence, i.e., such as authentication of a personal identification number (PIN). That is, in general, the systems and methods of the invention as described herein may be used in conjunction with other security/authentication measures or technologies.

After step 282 of FIG. 6, the process passes to step 284. In step 284, the process of FIG. 6 ends.

Figure 7:
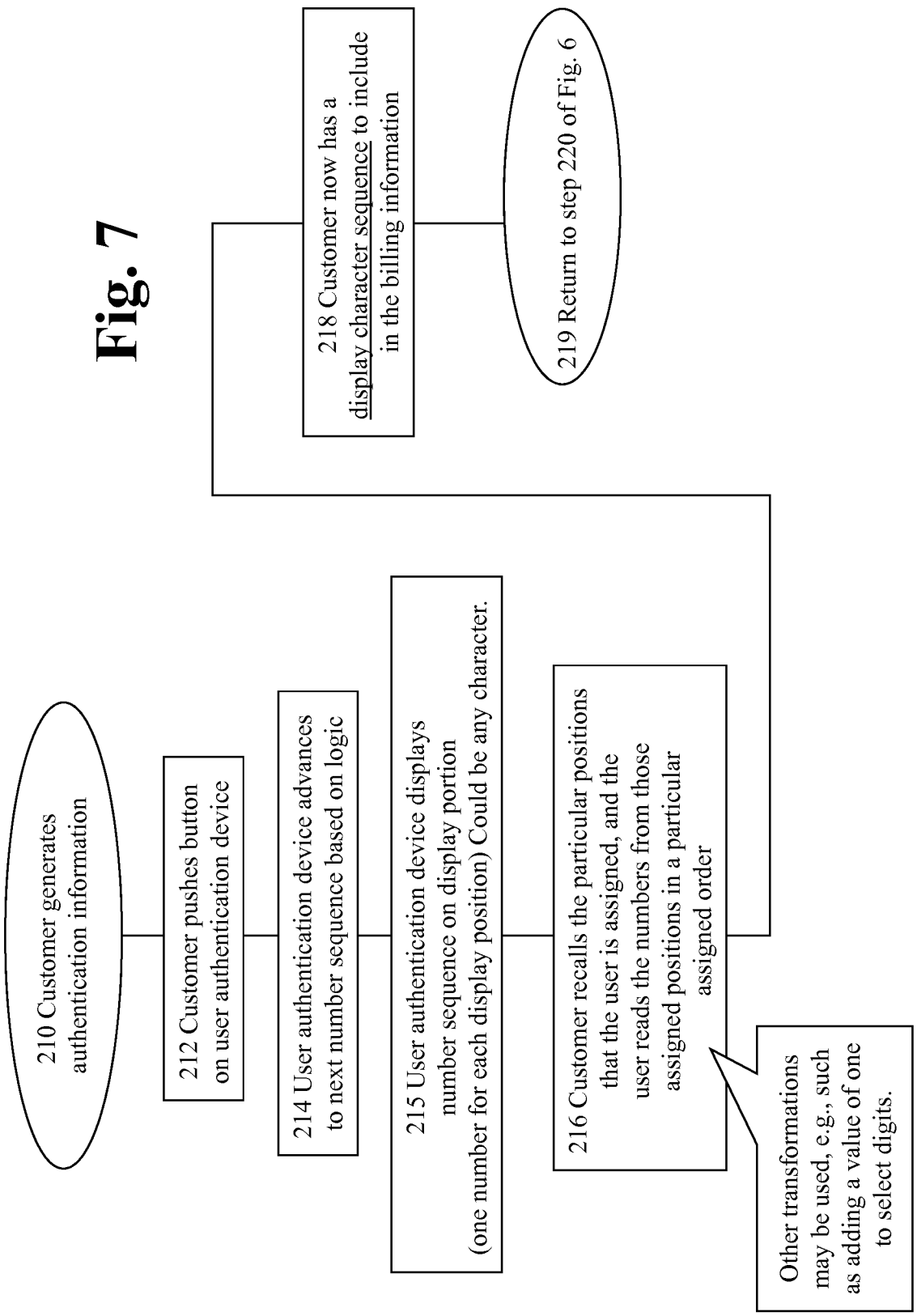
FIG. 7 is a flowchart showing further details of the "customer generates authentication information" step of FIG. 6 in accordance with one embodiment of the invention.

FIG. 7 is a flowchart showing further details of the "customer generates authentication information" step 210 of FIG. 6 in accordance with one embodiment of the invention. The subprocess of FIG. 7 starts in step 210 and passes to step 212. In step 212, the customer pushes a button on the user authentication device, which the customer has been provided. In response to the customer pushing the button, or in some other manner interfacing with the user authentication device, in step 214, the user authentication device advances to a next number sequence based on logic contained in the user authentication device (i.e., the user authentication device 120 displays information associated with the next "logic step" as described above). This logic may be in the form of an algorithm that generates a plurality of display characters in some predetermined manner, i.e., in a manner that an authentication entity system 140 may perform a generation of the same numbers based on the same logic.

Accordingly, in step 215 of FIG. 7, the user authentication device displays a number sequence on the display portion, i.e., one number for each display position. However, it is of course appreciated that the invention is not limited to the use of numbers. That is, any suitable character or other indicia might be used in lieu of or in conjunction with numbers.

Then, in step 216, the customer recalls the particular positions that the user is assigned. That is, out of six display positions, the customer only uses three numbers (associated with three display positions) so as to generate a display character sequence. In step 216, the customer further reads the numbers from those particular assigned positions in a particular assigned order.

Accordingly, in step 218, the customer now has a display character sequence to include in the billing information.

After step 218, the process passes to step 219 of FIG. 7. In step 219, the process returns to step 220 of FIG. 6.

Figure 8:
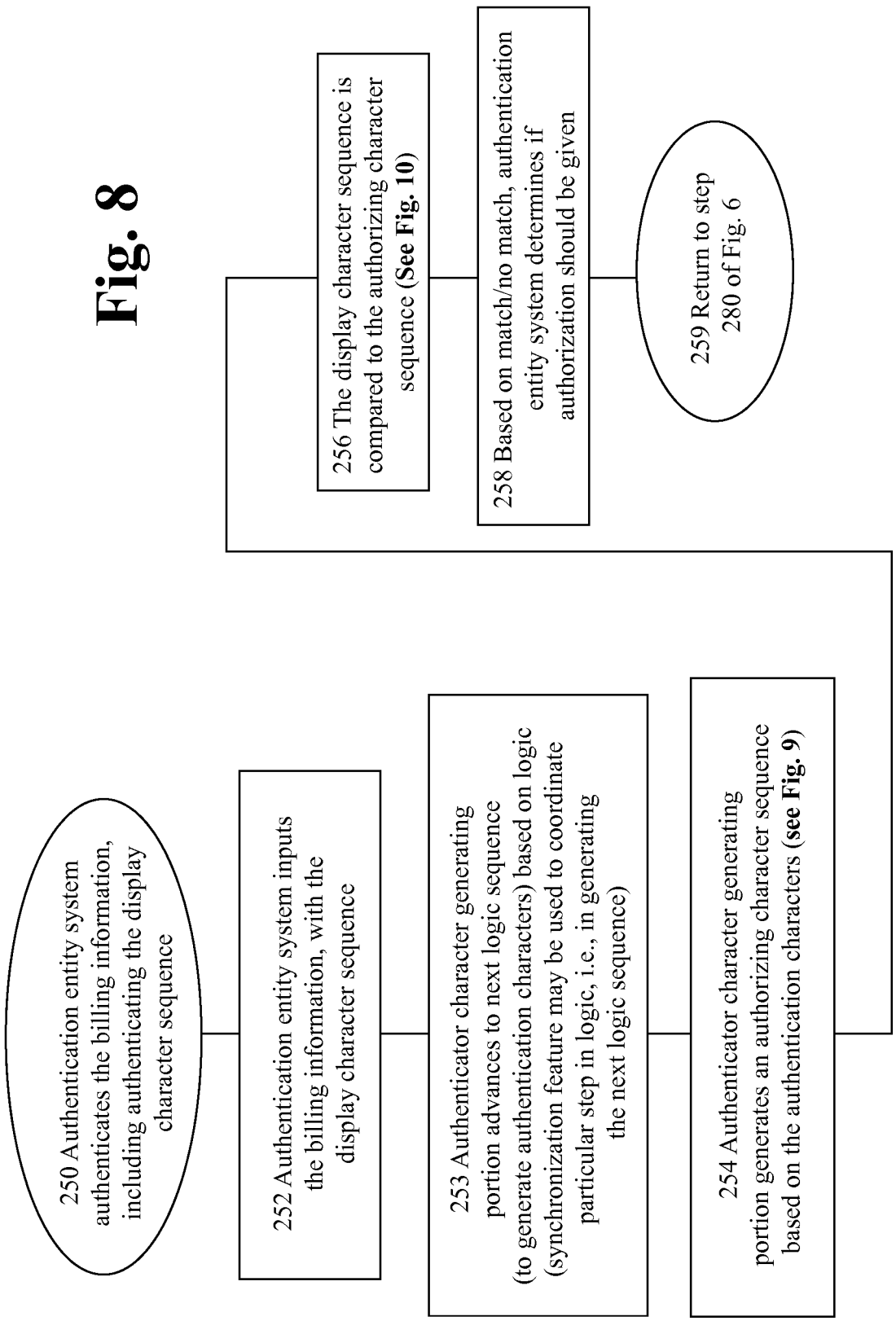
FIG. 8 is a flowchart showing in further detail the "authentication entity system authenticates the billing information, including authenticating the display character sequence" step of FIG. 6 in accordance with one embodiment of the invention.

FIG. 8 is a flowchart showing in further detail the "authentication entity system authenticates the billing information, including authenticating the display character sequence" step 250 of FIG. 6 in accordance with one embodiment of the invention. The subprocess of FIG. 8 starts in step 250 and passes to step 252.

In step 252 of FIG. 8, the authentication entity system inputs the billing information, including the display character sequence from the customer. Then, in step 253, the authenticator character generating portion (in the authentication entity system) advances to the next logic step, i.e., in parallel to the user authentication device 120. That is, the authenticator character generating portion generates authentication characters based on the same logic as is implemented in the user authentication device. It should be appreciated that some synchronization feature may be used to coordinate the particular step in logic, i.e., in generating the next logic step. After step 253 of FIG. 8, the process passes to step 254.

In step 254, the authenticator character generating portion in the authentication entity system generates an authorizing character sequence based on the authentication characters. Further details of step 254 are discussed below with reference to FIG. 9. Then, in step 256 of FIG. 8, the display character sequence is compared to the authorizing character sequence. Further details of step 256 are discussed below with reference to FIG. 10. After step 256, the process passes to step 258.

In step 258 of FIG. 8, based on a match or no match, the authentication entity system determines if authorization should be given. Then in step 259 of FIG. 8, the subprocess of FIG. 8 returns to step 280 of FIG. 6.

Figure 9:
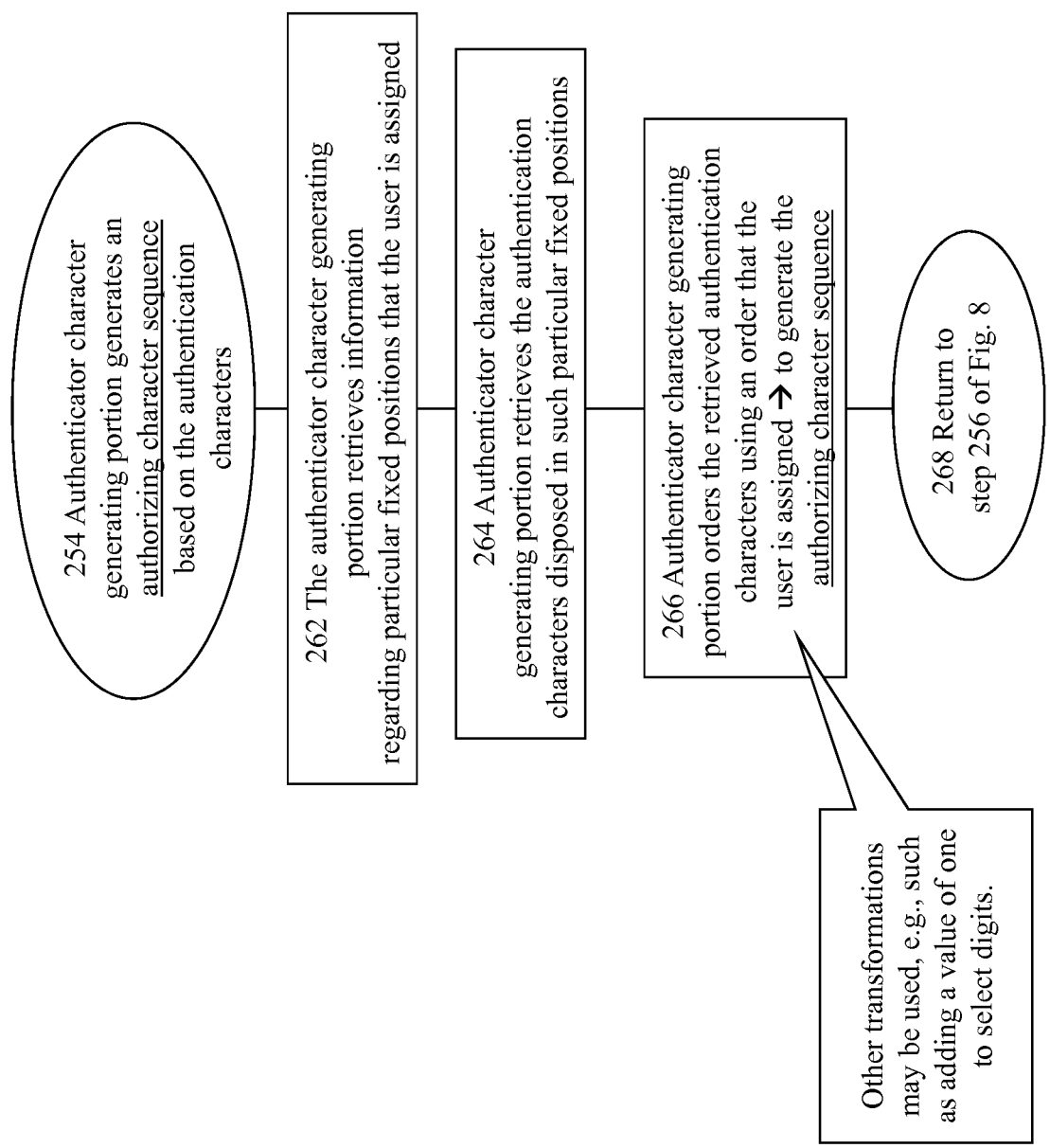
FIG. 9 is a flowchart showing in further detail the "authenticator character generating portion generates an authorizing character sequence based on the authentication characters" step of FIG. 8 in accordance with one embodiment of the invention.

FIG. 9 is a flowchart showing in further detail the "authenticator character generating portion generates an authorizing character sequence based on the authentication characters" step 254 of FIG. 8 in accordance with one embodiment of the invention. In this illustrative subprocess, after starting in step 254 of FIG. 9, the subprocess passes to step 262. In step 262, the authenticator character generating portion retrieves information regarding particular fixed positions that the user is assigned. Then, the process passes to step 264.

In step 264, the authenticator character generating portion retrieves the authentication characters disposed in such particular fixed positions. This processing is in parallel to the selection of numbers (from the display positions) as is performed by the customer. The, in step 266, the authenticator character generating portion orders the retrieved authentication characters using an order that the user is assigned. As a result, the authenticator character generating portion generates an "authorizing character sequence", which is to be compared with the "display character sequence" that is provided by the user. As shown in FIG. 9, other transformation processes might be used in lieu of ordering select characters. That is, any suitable transformation, e.g. such as ordering or adding a value of one, might be used to convert a plurality of selected characters (shown on the token display) to a display character sequence.

Thus, as otherwise noted herein, it is appreciated that some other transformation might be used in lieu of the ordering of the display characters 192. For example, numbers might be added, some mathematical transformation may be applied, and/or the same number might be used twice, for example, as well as other variations described herein.

After step 266 of FIG. 9, the process passes to step 268. In step 268, the subprocess of FIG. 9 returns to step 256 of FIG. 8.

Figure 10:
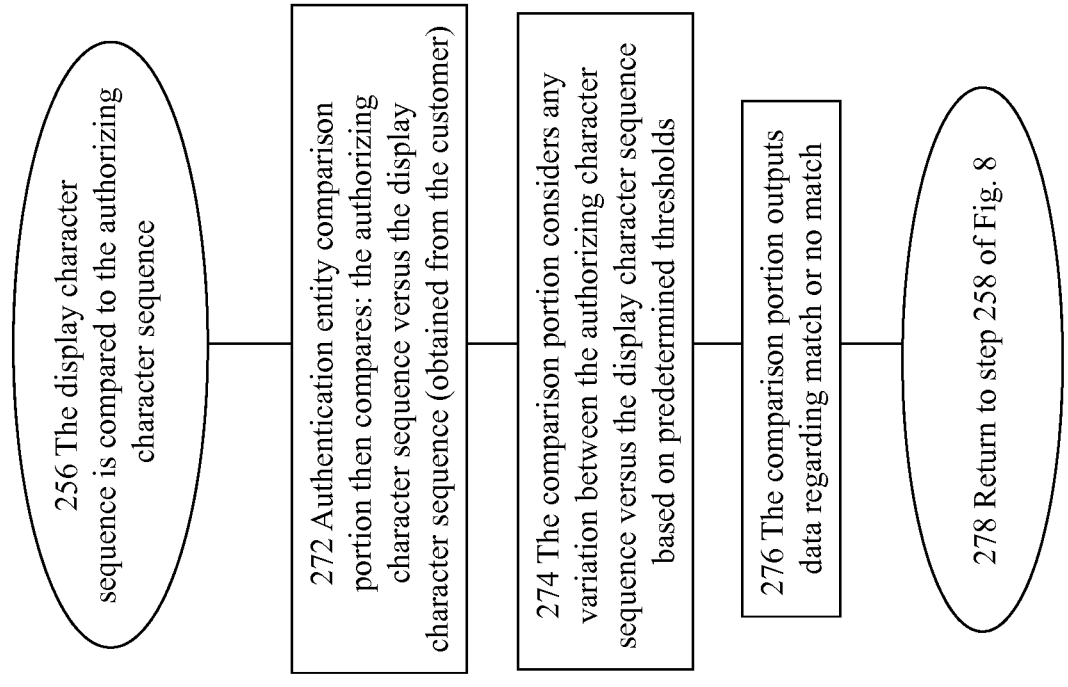
FIG. 10 is a flowchart showing in further detail the "display character sequence is compared to the authorizing character sequence" step of FIG. 8 in accordance with one embodiment of the invention.

FIG. 10 is a flowchart showing in further detail the "display character sequence is compared to the authorizing character sequence" step 256 of FIG. 8 in accordance with one embodiment of the invention. After starting in step 256 of FIG. 10, the subprocess passes to step 272.

In step 272, the authentication entity comparison portion compares: the authorizing character sequence versus the display character sequence (obtained from the customer). After step 272, the process passes to step 274. In step 274, the comparison portion considers any variation between the authorizing character sequence versus the display character sequence based on predetermined thresholds.

In other words, it might be the situation that the display character sequence does not exactly match the authorizing character sequence. However, if the variation is limited, then the variation might be acceptable so that the authentication entity system will still authenticate the transaction. The particulars of what is acceptable and what is not acceptable variation may be based on thresholds, as is desired.

After step 274 of FIG. 10, the process passes to step 276. In step 276, the comparison portion outputs data regarding match or no match back to the merchant. As a result, the merchant will process or not process the desired transaction. Then, in step 278 of FIG. 10, the process returns to step 258 of FIG. 8. Processing then continues as described above with reference to FIG. 8.

In summary, in accordance with one embodiment of the invention, the scheme described herein uses the idea of a remote token synchronized with or tracked with a central authentication database, and uses a cipher as the secret to authenticate the user. The use of the cipher, which may typically be relatively simple, together with the remote token system provides a novel combination in accordance with one embodiment of the invention.

In accordance with embodiments of the invention, the method described herein may be implemented in innumerable different ways, i.e., such as picking different simple ciphers. But there must be local and remote effectively random numbers, in accordance with one embodiment of the invention, so that a simple operation on the numbers can be computed by a person and used to authenticate that the person is the right person to be using the token, rather than simply confirming that the toke is correct.

In summary, the invention relates to the notion of using second encryption with a token that generates changing numbers, so that the second encryption embeds or combines additional information with the token's number, so that authentication depends on both. The additional information might be a pattern or other information remembered by an individual, some parameter (like amount) of a payment or transaction, or any other information it is desired to verify.

The invention further relates to the notion of combining information in such a way that someone who can figure what the token will be generating might use it to reconstruct some information remotely, with no fear of the information being intercepted by man in the middle attacks. For example, this functionality is discussed above in conjunction with using a purchase amount to generate a display character sequence, i.e., using the purchase amount and matching digits (of the purchase amount) with labels under the display positions.

As discussed above, the authentication entity system 140 authenticates a display character sequence that is provided by the customer. In accordance with one embodiment of the invention, the authentication entity system 140 does not allow multiple submissions of a display character sequence. To explain, the multiple submission checking portion 156 (of the authentication entity system 140) may perform a check on a newly submitted display character sequence. This check determines whether the particular display character sequence has been previously submitted, e.g., previously submitted in a particular period of time. If the multiple submission checking portion 156 determines that the particular display character sequence has been previously submitted, the authenticating processing portion 150 will not authenticate the display character sequence. For example, this might occur in the situation when a customer fails to press button 121 (on the user authentication device 120) to generate a new number sequence. That is, a repeat display character sequence (based on the repeat number sequence) will not be authenticated. The check for multiple display character sequences provides a further fraud prevention measure. To effect such checking, it should of course be appreciated that the authenticating processing portion 150 may be provided with the ability to keep track of which display character sequences have been observed.

As described above, in accordance with one embodiment of the invention, the customer pushes a button on the user authentication device 120 and a number sequence is displayed. From the number sequence, the customer selects characters to form the display character sequence. It is appreciated that if the number sequence is all fives, i.e., 5 5 5 5 5 5 (or even 2 2 2 2 4 4), then the particular order that the user has selected will be irrelevant. For this reason, the content of the number sequence displayed on the user authentication device 120 may want to be controlled, i.e., so as to avoid excessive repeat of numbers or other characters.

In accordance with a further aspect of the invention, it is appreciated that it may be needed to synchronize the user authentication device 120 with the authenticating processing portion 150. For example, it might be the situation that the user authentication device 120 has been exposed to multiple presses of the button (e.g., by a child). If the authenticating processing portion 150 receives a display character sequence that does not match with the next generated authorizing character sequence, the authenticating processing portion 150 may "run ahead."

That is, the authenticating processing portion 150 may run ahead with the authorizing character sequences assuming that there have been presses of the button 121 which were not submitted to the authentication entity system 140. The authenticating processing portion 150 may run ahead some predetermined number of times, until it finds a match, or alternately it reaches the predetermined number of times and concludes the display character sequence should not be authenticated.

Other approaches may be used to synchronize the user authentication device 120 to the authenticating processing portion 150. For example, all the display characters (displayed on the user authentication device 120) may be provided to the authenticating processing portion 150 (in the order that the characters are displayed) so as to perform synchronization. That is, given all the display characters in the displayed order, the authenticating processing portion 150 can then determine the correct point in the progression of the authentication characters.

Alternatively, the customer may provide two sets of display characters or two sets of display character sequences. These two sets, for example, might then be used by the authenticating processing portion 150 to synchronize with the user authentication device 120. i.e., based on the two sets of display characters, the authenticating processing portion 150 could determine where in the progression the user authentication device 120 is disposed.

In accordance with one embodiment of the invention, the user authentication device 120 may be used in multiple manners. For example, a customer may use the authentication device 120 to generate the display character sequence as described above, i.e., by selecting the display characters in a particular order. Such use may be implemented for Internet transactions, for example. However, in one embodiment, the same user authentication device 120 may also be used by submitting all the display characters to the merchant (and in turn the authenticating processing portion 150). A higher exchange rate may be applied to the second use as compared with the exchange rate applied to the first use. For example, such differential in exchange rate might be applied since the second use bears higher risk than the first use. Illustratively, the second use might occur in a situation in which the user authentication device 120 is used in a restaurant, and a person other than the customer is effecting the transaction.

In accordance with a further embodiment of the invention, a single token may be given to a family, or provided to be used in some other situation in which multiple persons will use the same token, i.e., the same user authentication device 120. In this situation, the user authentication device 120 will proceed through a progression of display characters, i.e., upon presses of the button 121. However, different users of the user authentication device 120 will be assigned different display positions to read characters, as well as a different order in which to place those observed characters. Accordingly, for example, if a brother were provided the display character sequence of FIG. 1, the brother will give the 2 5 9 number as shown in FIG. 1.

However, if the sister were given the same 5 3 7 9 2 1 display number, the sister might be assigned [position 5] [position 4] [position 1], i.e., and thus her display character sequence would be 2 9 5. Such embodiment allows different persons to collectively use the same user authentication device 120, while documenting which person used the user authentication device 120 for which transaction. In other words, each persons might be assigned there own display character sequence. Alternatively, it is of course appreciated that multiple tokens may be used in a single household.

Further, in accordance with one embodiment of the invention, the same person might use the same user authentication device 120, but be assigned different display character sequences for different uses of the user authentication device 120. For example, given a display number of 5 3 7 9 2 1, the single user may be assigned ([position 5] [position 4]

[position 1] (display character sequence would be 2 9 5)) for effecting financial transaction versus ([position 5] [position 1] [position 4] (display character sequence would be 2 5 6)) for opening their garage door.

Relatedly, it is of course appreciated that the systems and methods of the invention as described herein may be used for any of a variety of situations that an authentication procedure is required. For example, the invention may be used for effecting financial transactions, accessing information, opening doors, controlling access to devices (e.g. access to a computer) and/or other situations where an authentication procedure is needed. In particular the invention may be used to prevent fraud in high risk and/or high value transactions, e.g., Internet, telephone and ATM transactions. It is also to be appreciated that the reduced risk of fraud associated with using the invention might typically result in a lower interchange fee, as compared to financial transactions using other known authentication methods.

Further, it is appreciated that the authentication device 120 may take any of a variety of forms and/or be combined with other devices. For example, the user authentication device 120 may be used or combined with a cellular phone, a PDA, an RFID device, and/or other devices. For example, it should be appreciated that the display character sequence, as described herein, may be used in the place of a traditional PIN (personal identification number). Accordingly, the display character sequence might be used in an ATM transaction. Such might be used to prevent ATM Fraud.

Hereinafter, various embodiments and aspects of embodiments will be described.

In one embodiment, the invention herein described is a method by which token authentication can be incorporated in payment systems with very minor changes at issuer sites and using mainly existing merchant facilities. The method may use a token which will generate a display of numbers which changes either with time or with uses—and whose values are unpredictable to the external observer who has not complete information about the internal (hidden) mechanisms, i.e., processing.

One aspect of the invention is the use of the display of such a token or the use of a function or selection from that display (the selection or function being done by the customer as something he remembers) as an authenticator reported instead of the existing CVV2 or CVC2 (or equivalent for other card brands) card authenticator string. The CVV2 field is normally printed on the back of payment cards and is often asked for in phone or net transactions. Its value is checked mainly by the card issuer. The checking routine described herein can easily be adapted to check the correctness of the token-derived numbers for that particular token. Accordingly, this field is already present, it is already handled by payment networks. Thus, the use of the display character sequence (in lieu of the CVV2 or CVC2) presents few problems either for merchant expense or network changes and only very minor expense for the issuer.

As noted above, a further aspect relating to one embodiment of the invention is the use of a token display in place of PIN values. Facilities for entering PIN values already are widespread anywhere payment cards exist, and a replacement for a PIN value where the replacement changes (and especially one which depends on the token the customer has and on the selection pattern he knows) gives a much stronger authentication of the customer than a fixed PIN. Using this replacement may require no new network or merchant changes, and as PINs are checked by issuer only, the changes to issuer system would be basically limited to the PIN validation routines, which are well known and can be readily added to, i.e., so that issuer would validate the display character sequence, as opposed to a PIN.

Accordingly, in summary, it is noted that the display from a token with a display of variable numbers, or a function or permutation or selection from that display, may be used as an authenticator instead of CVV2 or CVC2 in credit card processing. Further, the display from such a card, or a permutation or selection from such a display, might be used instead of a PIN in card transactions or the logical equivalent thereof.

As described above, when a customer pushes the button on the token, e.g., the button 121 on the user authentication device 120, the display will show some numbers. In one embodiment, two digits display the least significant digits of an internal counter and 3 to 6 digits (preferably 6) display part of the result of encrypting the internal counter using an encryption key which is hidden within the card, and which may different for every card, i.e., the key should be different enough that anyone analyzing the innards of a card cannot compute the key for a different card even though he may know the complete keys of several other cards. Values may be supplied for these "diversified keys". In one embodiment, the encryption algorithm used may be a "strong" crypto algorithm, as strong as triple DES or better, but may depend on the particular use.

In one embodiment, when the button 121 is pressed, the idea is that the internal counter increments, and the Bank tracks its value, with the aid of the 2 digit low order display. It may be acceptable if the display is in octal radix instead of decimal if cost effective. The display needs to be visible either while the button is pressed, or for an interval after the button is pressed, so that the customer has at least 30 seconds (and preferably longer) to refer to it as he may need to compare it to other displays or transcribe it or recite it over the phone. The button must of course be very well debounced, and could well be used to e.g. drive a one-shot multivibrator so that it could be impossible to increment the counter more than once a minute. Something may be provided to ensure that the counter will increment by one only and not by large counts, i.e., even if the button is electrically noisy.

In one embodiment, the device may live for the 2-3 years that a credit card is issued for. Thus the power supply must suffice for this and for the expected number of uses the device will have. It may be preferable, in particular from a marketing perspective to have the device housed in a credit card. As noted herein, the incorporation of RFID functions may also be used.

In accordance with one embodiment of the invention, the invention authenticates a bank to a customers. On web pages we will want to assure customers they are talking to the real bank. Therefore we can ask them for the 2 digit counter display they see on pushing their button, and using our tracking data predict the internal counter value. By encrypting that with the card's key (we may have to ask for customer name or account number too), we can predict the display and tell the customer "your display will read nnnnnnnn if you are talking to the real bank. If not, hang up immediately and give no further information."

In one embodiment, the token is authenticated to the bank. In this aspect of use of the inventive token, the bank asks a customer to push the button and read the display. The process includes using the 2 digit display (which may be positioned alongside the display characters) to help determine what the counter is and compute the display and see if they match. If they don't, it is possible to try to assume the counter might be 100 or 200 or more. Accordingly, a few more encryptions may be attempted to see if the token value provided by the customer is indeed OK. Accordingly, a 2 digit display may be used in addition to the display of FIG. 1 so as to assist in determining where the customer is disposed in the progression of the token displays, i.e., if the customer's kids have been playing with the token button.

In accordance with a further aspect of the invention, a process may authenticate the customer to the bank. As described above, each customer is requested to pick an order in which to report digits of the display. We can have the digits numbered in print on the cards to facilitate this. Then the customer pushes his button, reports digits in the order he said he would use. Thus if the display shows:

77 561839 and the customer said he would report digits in order 5,1,6,3 (which he has to remember), he tells us the "77" part (if it is agreed upon for him to do so) and reports 3, 5, 9, 1 (the 5th, 1st, 6th, and 3rd digits of the random part). This relies on the token AND the customer memory. Also anyone in the middle who might be watching or recording what keys are pressed (remember lots of customer PCs have key loggers running) gets only random digits. Thus it doesn't matter if someone tries to record what the customer typed: it will change every time. Notice too that if the customer authenticates this way, it shows he has the token AND knows the pattern all at one go. The number of combinations is 6*5*4*3=360, high enough to cut accidental matches decently. We could ask for more than 4 digits if a higher number of combinations were required.

As also described above, it may be that we will want to end any web transactions by authenticating a second time, so that a thief who broke in and tried to use the credentials later, i.e., for a different transaction, would be detected.

In use of the described device for credit card transactions, instead of web, the customer may simply report the value of the display (or possibly the first several digits of the display) when asked for CVV2. It is noted that CVV2 reports may be 5 or more digits long, so the counter value AND some ciphertext could be reported. Alternatively the first part of the ciphertext could be reported for CVV2 if no more than 3 digits were accepted. At the back end, we would assume the counter incremented by 1 and compare, repeating for higher counter values till a comparison matched or we gave up, i.e., we would roll the counter ahead until we identified a match. In accordance with one embodiment of the invention, the back end has to track the counter in all cases. We expect that merchants will quickly start accepting CVV2, and accepting longer CVV2, to handle these devices since the quality of identification will be much higher than otherwise on phone or net orders, and they may eliminate substantial monies in fraud losses for merchants per year.

As described above, the user authentication device 121, e.g., a token, of the invention may be in a variety of forms. Also, the user authentication device 120 may be used in conjunction with a variety of features, as described below.

Optical light emitting devices (OLED) generally need to be fabricated on thin substrates with some electronics to control current flow to the light emitting polymers. It might be sensible to think of building a backplane for such devices (which are very thin and flexible) on which you also etch transistors and the like to perform the counting, debouncing, crypto, and possibly display timing as well, in one embodiment. A bit of flash memory may be built onto this backplane (to hold the counter value and a diversified key, if so desired. This would mean that all connections become part of a printed circuit, and the arrangement might be in the form of a small rectangle laid down in the inside of a card, to be covered by a transparent cover. Then the connections might only be to a battery and button.

In accordance with one embodiment of the invention, a piezoelectric element may be used for power. In such an arrangement, the customer would press on a printed circle, i.e., to press the element and generate electricity, avoiding button contacts. Also, pressing or bending energy might be used, if workable.

In accordance with one embodiment of the invention, a thin RFID IC bonded onto a display backplane would allow the cryptography, accumulation, password setup, etc. all to be done on a not too heavily altered RFID chip.

Initializing the crypto key might be done via fuses, via RFID, or a capacitive feed scheme which could use pulse trains to set the keys up one bit at a time without needing full contact. This can be shared separately if need be. Other schemes can be used.

A variety of power sources may be used to power the button 121. For example, photoelectric cells, electrets, and/or known battery arrangements may be used.

It is noted that the device must be reliable during its life, even though it will typically live in a wallet or purse.

In accordance with one embodiment of the invention, the user authentication device 120 may include a display that has 2 parts, i.e., a 2 digit field and a longer field (which might be 6 digits long, for example). Every time the customer presses the button, the 2 digit field increments and the longer field gets a set of what look like random numbers. No two card sequences are like.

In accordance with one aspect of the invention described above, an authenticating entity may wish to insure that a transaction amount is approved by the customer. The customer may take the first few digits of the amount (the purchase amount) and use them as positions to report on the display. As described above we might have display digits representing 2 digits each and have the customer enter the displayed numbers at those positions. What gets actually transmitted is a few random digits, but they can be checked against the amount as well as the device identity, proving that someone with the same device who authenticated moments before sent an acceptance for the amount of the transaction.

The systems and methods of the invention provide a wide variety of advantages. In accord with some embodiments, the inventive device may largely eliminate phishing: there is no point in stealing things like card numbers or account numbers when the variable device is required to get money. In accord with some embodiments, the inventive device may vastly reduce phone or net fraud. This will cut both issuer and merchant losses. In accord with some embodiments, the inventive device may eliminate intra-family fraud so long as individual devices are given to each person and so long as the people don't give their patterns away. In accord with some embodiments, the inventive device may make customer data cheaper to handle because less of it will be privacy sensitive. People don't mind when their phone numbers are given out most of the time. If their card number can't be used to rob them or damage their credit, they won't care if it is given out either. In accord with some embodiments, the inventive device may cut fraud in ATMs and/or at merchants if the device is used to generate pseudo PINs which would authenticate transactions. Because the transmitted data is in effect encrypted, even cameras watching PIN pads will be useless in stealing such credentials. It is noted that most merchants have PIN pads already which could be used in implementation of the invention. In addition, the device shows the customer that his credentials are being generated securely and shows that its issuer is doing something very tangible in protecting the customer's identity. The savings to merchants are sizeable and should in addition give some merchants good incentives to prefer these devices and to give incentives to customers to use them.

Further examples of use of the user authentication device 120, in accordance with embodiments of the invention, are set forth below.

In accordance with one embodiment of the invention, for net use, i.e., a purchase over the Internet, the customer might give his username and password. Then, the customer gives the value of the low order digits. The authentication entity then determines what the ciphertext (0:2) should be and conveys such to the customer, telling customer "if this doesn't match your display, you are talking to a fraud site. Then, if ciphertext (0:3) is OK, the authentication entity may ask the customer to enter ciphertext (3:5) and check that it is also valid. For example as used in this example, 3:5 means the digits shown in positions 3, 4 and 5.

To explain further, in an embodiment, the customer might provide half of the displayed digits to an authentication entity. Based on these provided digits, the authentication entity can then (if needed) determine where the customer is in the progression of the token. The authentication entity can then generate displayed characters (corresponding to those displayed by the customer), and the authentication entity then provides at least a portion of such displayed characters back to the customer. For example, the authentication entity might provide a portion or all of the displayed characters back to the customer. In this manner, the authentication entity knows they are dealing with a particular customer and the customer knows they are dealing with a particular authentication entity. Variations of this embodiment are of course possible regarding what portion of a character displayed is provided by what entity, e.g., what characters are provided by the customer and what characters are provided by the authentication entity. Further, the two parties authenticating may of course perform any agreed upon transformation to the characters displayed on the token (or other device), i.e., such as providing select numbers in a particular order, or adding a 1 to each displayed number, for example, or any other suitable transformation. Accordingly, the providing of a select number of digits in a particular order is merely one transformation that might be performed.

As noted above, the authentication entity might provide a portion or all of the displayed characters back to the customer (or a transform of the displayed characters), and in this manner, the customer knows they are dealing with a particular authentication entity. Alternatively, or in addition to, the authentication entity might provide a portion or all of the next pattern, e.g., the next set of display characters, which may then be verified by the customer. The next pattern may also of course be transformed in some manner. Thus, in some agreed upon manner to authenticate, the authentication entity (or the customer) may convey to the other a portion or all of the display characters (or their equivalent such as the authentication characters 196), some transform of the display characters, and/or a portion or all of the next set of display characters (which may also be transformed), for example.

In accordance with one aspect of the invention relating to use with credit card transactions, the issuer might offer a direct validation service to merchants. The issuer could then do as much of the authentication processing as desired. Further, it would place the issuer in a position to check passwords or take a voice sample, or perform various other authentication, as may be desired. Further, the issuer might use ciphertext (3:5) instead of CVV2 in transaction information that was sent with the charge. It is noted the reported track 2 data may be used to capture two or so digits of low order counter in discretionary data fields. As issuer, we would recognize that the presented CVV2 was a variable one and validate accordingly, i.e., either searching the next several counter values for the customer, or using the discretionary data fields to reduce the amount of crypto to be done, e.g. reduce the need to roll ahead in search of a match.

In accordance with one embodiment of the invention, for ATM processing, the card may be inserted, and read by the ATM. The card would then be ejected and the customer enters the value of counter low digits, checks that the right ciphertext is displayed by the ATM (i.e., the display character sequence as described above), and only then enters her PIN and/or other ciphertext, as may be desired. This processing would convey the customer had some reason to think the ATM was communicating with the issuer before giving his PIN.

In accordance with one embodiment of the invention, the system uses different digits of ciphertext to authenticate to the customer that he is talking to the bank first, then to authenticate to the bank that the customer is who he claims to be. That is, the process checks that the card's identity is real. Tying the card to the customer requires asking for another password/PIN, or sampling voice, or the like. It might be that voice or a PIN recognition measures are required for higher value transactions, and not for low value ones.

For phone orders, the customer may be asked for the low digits of the counter and the ciphertext (at least one of the sets). Either a Bank authentication service could be called with this information and the card number/customer name, or the low digits could be passed in discretionary characters in Track 2 of card image data. (For time based card displays some of the ciphertext could be used as CVV2 not needing any additional data passed back.) Merchants knowing the variable number matched would be assured it would be less likely chargebacks could occur because the authentication was stronger. In one embodiment, the invention would exist on every credit card, and the only area needing change would be the issuer backend, i.e., the routine that checks CVV2. Such backend would know or compute the diversified key on the card, and track and encrypt the card counter and verify the ciphertext. Accordingly, processing change would be negligible.

In accordance with embodiments of the invention, it is appreciated that non-numeric indicia might be used along with, or in lieu of, the numerics described above, as may be desired. That is any symbol, graphic, picture, or other information representation, for example, might be used in lieu of, or along with, the numerics discussed above, as may be desired.

Further, it is appreciated that a constant value (i.e., a constant: number, symbol, graphic, picture, or other information representation, for example) might be used along with a variable value, or a set of variable values, which are described above.

As described above, FIGS. 1-4 and 10 show embodiments of structure and system of the invention. Further, FIGS. 5-10 show various steps in accordance with one embodiment of the invention. It is appreciated that the systems and methods described herein may be implemented using a variety of technologies. Hereinafter, general aspects regarding possible implementation of the systems and methods of the invention will be described.

It is understood that the system of the invention, and portions of the system of the invention, may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method of authenticating a transaction involving a user authentication device, a merchant, and an authentication entity system, the method comprising:
   registering, by the authentication entity system, a sequence of position labels with a user identifier;
   receiving, by the authentication entity system, a transaction request from a merchant electronic device;
   storing, by the authentication entity system, the transaction request;
   generating, by the authentication entity system, a plurality of fields for the transaction request;
   assigning, by the authentication entity system, a position label to each field of the plurality of fields;
   assigning, by the authentication entity system, a character to each field of the plurality of fields;
   generating, by the authentication entity system, a first sequence using the assigned characters;
   displaying, by the authentication entity system, the first sequence on the user authentication device;
   receiving, by the authentication entity system, from the user authentication device, a second sequence and the user identifier, wherein the second sequence is a subset of the first sequence;
   retrieving, by the authentication entity system, the position label for each character in the second sequence;
   comparing, by the authentication entity system, the retrieved sequence of position labels to the registered sequence of position labels;
   determining, by the authentication entity system, that the retrieved sequence of position labels match the registered sequence of position labels; and
   based on the determining, authorizing, by the authentication entity system, the stored transaction request.

2. The method of claim 1, wherein the registered sequence of position labels is set by the user.

3. The method of claim 1, wherein the registered sequence of position labels is based on an amount of a transaction in the transaction request.

4. The method of claim 1, wherein at least one character comprises at least one wildcard.

5. The method of claim 1, wherein the characters are alphanumeric characters.

6. The method of claim 1, wherein the characters are randomly generated.

7. The method of claim 1, wherein the characters are generated periodically.

8. The method of claim 1, wherein the characters are generated for each transaction.

9. The method of claim 1, wherein the display of the first sequence is displayed on the customer electronic device with an indication of each character's position identifier.

* * * * *